US012447467B2

(12) United States Patent
Mountford et al.

(10) Patent No.: US 12,447,467 B2
(45) Date of Patent: Oct. 21, 2025

(54) BORYLIMIDE CATALYSTS

(71) Applicant: SCG CHEMICALS PUBLIC COMPANY LIMITED, Bangkok (TH)

(72) Inventors: Philip Mountford, Oxford (GB); Benjamin A. Clough, Oxford (GB); Bowen Xie, Oxford (GB)

(73) Assignee: SCG Chemicals Public Company Limited, Bangkok (TH)

( * ) Notice: Subject to any disclaimer, the term of this patent is extended or adjusted under 35 U.S.C. 154(b) by 317 days.

(21) Appl. No.: 17/294,785

(22) PCT Filed: Nov. 19, 2019

(86) PCT No.: PCT/GB2019/053263
§ 371 (c)(1),
(2) Date: May 18, 2021

(87) PCT Pub. No.: WO2020/104779
PCT Pub. Date: May 28, 2020

(65) Prior Publication Data
US 2022/0072522 A1 Mar. 10, 2022

(30) Foreign Application Priority Data
Nov. 20, 2018 (EP) ..................... 18207325

(51) Int. Cl.
B01J 31/00 (2006.01)
B01J 31/18 (2006.01)
C08F 4/64 (2006.01)
C08F 4/659 (2006.01)
C08F 110/02 (2006.01)

(52) U.S. Cl.
CPC ......... *B01J 31/182* (2013.01); *C08F 4/64089* (2013.01); *C08F 4/65916* (2013.01); *B01J 2531/0258* (2013.01); *B01J 2531/46* (2013.01); *B01J 2540/40* (2013.01); *C08F 110/02* (2013.01)

(58) Field of Classification Search
None
See application file for complete search history.

(56) References Cited

U.S. PATENT DOCUMENTS

| | | | |
|---|---|---|---|
| 5,399,634 | A | 3/1995 | Carney et al. |
| 5,405,924 | A | 4/1995 | Kelsey |
| 6,846,769 | B2 | 1/2005 | Arndt-Rosenau et al. |
| 7,250,523 | B2 | 7/2007 | Odom et al. |
| 7,534,842 | B2 | 5/2009 | Jayaratne et al. |
| 8,680,306 | B2 | 3/2014 | Chahen et al. |
| 8,680,307 | B2 | 3/2014 | Chahen et al. |
| 10,072,036 | B2 | 9/2018 | Buchmeiser et al. |
| 2017/0260213 | A1 | 9/2017 | Sundermeyer et al. |

FOREIGN PATENT DOCUMENTS

| | | |
|---|---|---|
| EP | 0641804 A2 | 3/1995 |
| WO | 1994/000439 A1 | 1/1994 |
| WO | 2000/007725 A1 | 2/2000 |
| WO | 2005/123790 A1 | 12/2005 |
| WO | 2015/162245 A2 | 10/2015 |

OTHER PUBLICATIONS

Clough et al. Inorganic Chemistry, 56, 10794-10814 (Year: 2017).*
Bigmore et al. Chem. Commun., 2006, 436-438 (Year: 2006).*
Weber et al. (Zeitschrift fuer Naturforschung, B: Chemical Sciences, 1999, 54, 363-371). (Year: 1999).*
Adams et al., Discovery and evaluation of highly active imidotitanium ethylene polymerisation catalysts using high throughput catalyst screening. Chem Commun (Camb). Feb. 21, 2004;(4):434-5.
Arnold et al., Polymethylaluminoxane supported zirconocene catalysts for polymerisation of ethylene. J Organomet Chem. 2016:822;85-90.
Bigmore et al., A remarkable inversion of structure-activity dependence on imido N-substituents with varying co-ligand topology and the synthesis of a new borate-free zwitterionic polymerisation catalyst. Chem Commun (Camb). Jan. 28, 2006;(4):436-8.
Bigmore et al., Synthesis, structures, and olefin polymerization capability of vanadium(4+) imido compounds with fac-N3 donor ligands. Inorg Chem. Aug. 7, 2006;45(16):6411-23.
Bolton et al., Synthesis and Ethylene Polymerization Capability of Metallocene-like Imido Titanium Dialkyl Compounds and Their Reactions with AliBu3. Organometallics. Oct. 2006:25(23);5549-65.
Bolton et al., Transition metal imido compounds as ziegler-natta olefin polymerisation catalysts. Adv Synth Catal. 2005:347;355-66.
Clough et al., Synthesis of titanium borylimido compounds supported by diamide-amine ligands and their reactions with alkynes. Organometallics. Jun. 15, 2018:37(20);3558-72.
Danopoulous et al., Organoimido complexes of tungsten. X-ray crystal structures of W(NC6H11)CI2(PMe3)3, [W(NC6H11)CI2(PMe3)3]O3SCF3, [W(NC6H11)CI(PMe3)4]BPh4, W[NSi(o-MeC6H4)3]CI2(PMe3)3, W[NB(mes2)]2C12 (PMe3)2, {W(NPh)CI[O2C2(CF3)4]2}Li and WCI4(PMe2Ph)3. Polyhedron. May 1993:12(9):1061-71.
Fraser et al., Titanium and Zirconium Permethylpentalene Complexes, Pn*MCpRX, as Ethylene Polymerization Catalysts. Organometallics. Aug. 1, 2016:35(16); 2664-74.
Fryzuk et al., Hydroboration of coordinated dinitrogen: a new reaction for the N2 ligand that results in its functionalization and cleavage. Angew Chem Int Ed Engl. Oct. 4, 2002;41(19):3709-12; 3523.
Grant et al., Molecular titanium nitrides: nucleophiles unleashed. Chem Sci. Feb. 1, 2017;8(2):1209-24.

(Continued)

*Primary Examiner* — Yun Qian
(74) *Attorney, Agent, or Firm* — McCarter & English, LLP; Steven G. Davis; Wei Song

(57) ABSTRACT

The present invention provides a borylimide catalyst and further relates to compositions comprising the borylimide catalysts and processes for the polymerisation of olefins (e.g. ethylene) using the borylimide catalysts or the compositions comprising the borylimide catalysts.

12 Claims, No Drawings

(56) References Cited

OTHER PUBLICATIONS

Hadlington et al., Stabilization of a two-coordinate, acyclic diaminosilylene (ADASi): completion of the series of solable diaminotetrylenes, :E(NR(2)(2) (E = group 14 element). Chem Commun (Camb). Jan. 28, 2016;52(8):1717-20.
Jafarpour et al., A sterically demanding nucleophilic carbene: 1,3-bis(2,6-diisopropylphenyl)imidazol-2-ylidene). Thermochemistry and catalytic application in olefin metathesis. J Organomet Chem. Jul. 14, 2000:606(1):49-54.
Kohn et al., The Chemistry of 1,3,5-Triazacyclohexane Complexes. 6.(1) Synthesis and Characterization of the Cobalt(II) Methoxide Core {Co(3)(OMe)(4)}(2+). Inorg Chem. Dec. 17, 1997;36(26):6064-9.
Owen et al., Cyclopentadienyl Titanium Imido Compounds and Their Ethylene Polymerization Capability: Control of Molecular Weight Distributions by Imido N-Substituents. Organometallics. Nov. 29, 2006:26(1);83-92.
Proust et al., Effect of sulfonyl protecting groups on the neighboring group participation ability of sulfonamido nitrogen. J Org Chem. Apr. 3, 2009;74(7):2897-900.
Segawa et al., Chemistry of borylithium: synthesis, structure, and reactivity. J Am Chem Soc. Nov. 26, 2008;130 (47):16069-79.
Thompson et al., A nitrido salt reagent of titanium. J Am Chem Soc. Jun. 11, 2014;136(23):8197-200.
Vlaar et al., Sustainable synthesis of diverse privileged heterocycles by palladium-catalyzed aerobic oxidative socyanide insertion. Angew Chem Int Ed Engl. Dec. 21, 2012;51(52):13058-61.
Weber et al., Electrochemical and spectroelectrochemical studies of C-benzodiazaborolyl-ortho-carboranes. Dalton Trans. Feb. 14, 2013:42(6):2266-81.
Weber et al., Recent Advances in the Synthesis of N-Heteroatom Substituted Imido Complexes Containing a Nitrido Bridge [M=N—E] (M = Group 4, 5 and 6 Metal, E = B, Si, Ge, P, S). J Inorg Gen Chem. May 2003:629(5);744-54.
Wright et al., Tungsten imido catalysts for selective ethylene dimerisation. Chem Commun (Camb). Feb. 14, 2016;52 (13):2850-3.
Terabayashi et al., Group-4 transition-metal boryl complexes: syntheses, structures, boron-metal bonding properties, and application as a polymerization catalyst. J Am Chem Soc. Oct. 14, 2009;131(40):14162-3.
Adams et al., Imido titanium ethylene polymerization catalysts containing triazacyclic ligands. Organometallics. Jul. 2006;25:3888-903.
Clough et al., New titanium borylimido compounds: synthesis, structure, and bonding. Inorg Chem. Sep. 5, 2017;56 (17):10794-10814.
Stevenson et al., Reactions of titanium hydrazides with silanes and boranes: N—N bond cleavage and N atom functionalization. J Am Chem Soc. Aug. 19, 2015;137(32):10140-3.
International Search Report and Written Opinion for Application No. PCT/GB2019/053263, dated Jan. 15, 2020, 15 pages.
Extended European Search Report for Application No. EP18207325.4, dated Mar. 29, 2019, 8 pages.

* cited by examiner

BORYLIMIDE CATALYSTS

CROSS-REFERENCE TO RELATED APPLICATIONS

This application is a U.S. national stage filing, under 35 U.S.C. § 371(c), of International Application No. PCT/GB2019/053263, filed on Nov. 19, 2019, which claims priority to European Patent Application No. 18207325.4, filed on Nov. 20, 2018. The entire contents of each of the aforementioned applications are incorporated herein by reference.

INTRODUCTION

The present invention relates to borylimide catalysts. The present invention also relates to compositions comprising the borylimide catalysts and processes for the polymerisation of olefins (e.g. ethylene) using the borylimide catalysts or the compositions comprising the borylimide catalysts.

BACKGROUND OF THE INVENTION

It is well known that ethylene (and α-olefins in general) can be readily polymerized at low or medium pressures in the presence of certain transition metal catalysts. These catalysts are generally known as Zeigler-Natta type catalysts.

Subsequent catalyst developments in this field led to the discovery of metallocene catalysts, constrained geometry catalyst (CGC) complexes and more recently, post-metallocene systems, whereby one or more of the cyclopentadienyl ligands of the metallocene catalyst systems are replaced by a different moiety [Gibson & Spitzmesser, *Chem. Rev.* (2003), 103, 283-315].

Adams et al. (Organometallics, 2006, 25 (16), 3888-3903) and Bigmore et al. (*Chem. Commun.*, 2006, 436-438) disclose ethylene polymerization catalysts which are N-alkyl or N-aryl imido substituted titanium complexes containing polydentate ligands.

Nevertheless, despite the advances made by metallocene, CGC complexes and more recently post-metallocene catalysts, there remains a need for new non-metallocene catalysts capable of effectively polymerizing olefins. It is desirable that such catalysts are highly active and lead to polyolefins exhibiting high molecular weight and/or low polydispersity.

The present invention was devised with the foregoing in mind.

SUMMARY OF THE INVENTION

According to a first aspect of the present invention there is provided a compound of formula (I):

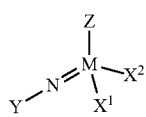

(I)

wherein:
M is selected from titanium, zirconium and hafnium;
$X^1$ and $X^2$ are independently selected from halo, hydrogen, a phosphonate, sulfonate or boronate group, amino, (1-6C)alkyl, (1-6C)alkoxy, aryl, aryloxy and heterocycloalkyl (such as THF), wherein said (1-6C)alkyl, (1-6C)alkoxy, aryl and aryloxy groups may be optionally substituted with one of more groups selected from halo, oxo, hydroxy, amino, nitro, (1-6C)alkyl, (2-6C)alkenyl, (2-6C)alkynyl, (1-6C)haloalkyl, (1-6C)alkoxy, aryl and $Si[(1-4C)alkyl]_3$;
Y is $BR^1R^2$;
Z is a polydentate ligand coordinated to M by at least 2 donor atoms Q, wherein each Q is independently selected from N, O, S and P;
$R^1$ and $R^2$ are independently selected from $NR^3R^4$, $OR^5$, $SR^6$ and $CR^7R^8R_9$;
$R^3$, $R^4$, $R^5$, $R^6$, $R^7$, $R^8$ and $R^9$ are independently selected from hydrogen, (1-6C)alkyl, (2-6C)alkenyl, (2-6C)alkynyl, aryl and heteroaryl, wherein said (1-6C)alkyl, (2-6C)alkenyl, (2-6C)alkynyl, aryl and heteroaryl groups are optionally substituted with one or more substituents selected independently from halo, hydroxy, amino, nitro, (1-6C)alkyl and (1-6C)haloalkyl;
or $R^1$ and $R^2$ are linked, such that when taken in combination with the boron atom to which they are attached, they form a group:

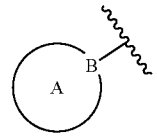

wherein ring A is a carbocyclic or heterocyclic ring, optionally substituted with one or more substituents selected independently from halo, hydroxy, amino, (1-6C)alkyl, (1-6C)alkoxy, (1-6C)haloalkyl, aryl and heteroaryl, wherein said aryl and heteroaryl groups are optionally substituted with one or more substituents selected independently from halo, hydroxy, amino, nitro, (1-6C)alkyl and (1-6C)haloalkyl.

According to a second aspect of the present invention there is provided a composition comprising a compound according to formula (I) as defined herein immobilised on a solid support material.

According to a third aspect of the present invention there is provided a process for the polymerisation of at least one olefin, the process comprising the step of contacting the at least one olefin with a compound having a structure according to formula (I) as defined herein.

DETAILED DESCRIPTION OF THE INVENTION

Definitions

The term "(m-nC)" or "(m-nC) group" used alone or as a prefix, refers to any group having m to n carbon atoms.

The term "alkyl" as used herein refers to straight or branched chain alkyl moieties, typically having 1, 2, 3, 4, 5 or 6 carbon atoms. This term includes reference to groups such as methyl, ethyl, propyl(n-propyl or isopropyl), butyl (n-butyl, sec-butyl or tert-butyl), pentyl, hexyl and the like. In particular, an alkyl may have 1, 2, 3 or 4 carbon atoms.

The term "alkylene" as used herein refers to straight chain bi-valent alkyl moieties, typically having 1, 2, 3, 4, 5 or 6 carbon atoms. This term includes reference to groups such as methylene ($—CH_2—$), ethylene ($—CH_2CH_2—$), propylene (—CH₂CH₂CH₂—) and the like. In particular, an alkylene may have 1, 2 or 3 carbon atoms.

The term "alkenyl" as used herein refers to straight or branched chain alkenyl moieties, typically having 2, 3, 4, 5 or 6 carbon atoms. The term includes reference to alkenyl moieties containing 1, 2 or 3 carbon-carbon double bonds (C=C). This term includes reference to groups such as ethenyl(vinyl), propenyl(allyl), butenyl, pentenyl and hexenyl, as well as both the cis and trans isomers thereof.

The term "alkenylene" as used herein refers to straight chain bi-valent alkylenyl moieties, typically having 2, 3, 4, 5 or 6 carbon atoms. This term includes reference to groups such as ethenylene (—CH=CH—), propenylene (—CH=CHCH₂—) and the like, as well as both the cis and trans isomers thereof. In particular, an alkenylene may have 2 or 3 carbon atoms.

The term "alkynyl" as used herein refers to straight or branched chain alkynyl moieties, typically having 1, 2, 3, 4, 5 or 6 carbon atoms. The term includes reference to alkynyl moieties containing 1, 2 or 3 carbon-carbon triple bonds (C≡C). This term includes reference to groups such as ethynyl, propynyl, butynyl, pentynyl and hexynyl.

The term "haloalkyl" as used herein refers to alkyl groups being substituted with one or more halogens (e.g. F, Cl, Br or I). This term includes reference to groups such as 2-fluoropropyl, 3-chloropentyl, as well as perfluoroalkyl groups, such as perfluoromethyl.

The term "alkoxy" as used herein refers to —O-alkyl, wherein alkyl is straight or branched chain and comprises 1, 2, 3, 4, 5 or 6 carbon atoms. In one class of embodiments, alkoxy has 1, 2, 3 or 4 carbon atoms. This term includes reference to groups such as methoxy, ethoxy, propoxy, isopropoxy, butoxy, tert-butoxy, pentoxy, hexoxy and the like.

The term "aryl" or "aromatic" as used herein means an aromatic ring system comprising 6, 7, 8, 9 or 10 ring carbon atoms. Aryl is often phenyl but may be a polycyclic ring system, having two or more rings, at least one of which is aromatic. This term includes reference to groups such as phenyl, naphthyl and the like. Unless otherwise specification, aryl groups may be substituted by one or more substituents. A particularly suitable aryl group is phenyl.

The term "aryloxy" as used herein refers to —O-aryl, wherein aryl has any of the definitions discussed herein. Also encompassed by this term are aryloxy groups in having an alkylene chain situated between the O and aryl groups.

The term "heteroaryl" or "heteroaromatic" means an aromatic mono-, bi-, or polycyclic ring incorporating one or more (for example 1-4, particularly 1, 2 or 3) heteroatoms selected from nitrogen, oxygen or sulfur. Examples of heteroaryl groups are monocyclic and bicyclic groups containing from five to twelve ring members, and more usually from five to ten ring members. The heteroaryl group can be, for example, a 5- or 6-membered monocyclic ring or a 9- or 10-membered bicyclic ring, for example a bicyclic structure formed from fused five and six membered rings or two fused six membered rings. Each ring may contain up to about four heteroatoms typically selected from nitrogen, sulfur and oxygen. Typically, the heteroaryl ring will contain up to 3 heteroatoms, more usually up to 2, for example a single heteroatom.

The term "carbocyclyl", "carbocyclic" or "carbocycle" means a non-aromatic saturated or partially saturated monocyclic, or a fused, bridged, or spiro bicyclic carbocyclic ring system(s). Monocyclic carbocyclic rings contain from about 3 to 12 (suitably from 3 to 7) ring atoms. Bicyclic carbocycles contain from 7 to 17 carbon atoms in the rings, suitably 7 to 12 carbon atoms, in the rings. Bicyclic carbocyclic rings may be fused, spiro, or bridged ring systems. A carbocyclic ring may be fused to an aryl or heteroaryl ring.

The term "heterocycloalkyl", "heterocyclic" or "heterocycle" means a non-aromatic saturated or partially saturated monocyclic, fused, bridged, or spiro bicyclic heterocyclic ring system(s). Monocyclic heterocyclic rings contain from about 3 to 12 (suitably from 3 to 7) ring atoms, with from 1 to 5 (suitably 1, 2 or 3) heteroatoms selected from nitrogen, oxygen or sulfur in the ring. Bicyclic heterocycles contain from 7 to 17 member atoms, suitably 7 to 12 member atoms, in the ring. Bicyclic heterocyclic(s) rings may be fused, spiro, or bridged ring systems. A heterocyclic ring may be fused to an aryl or heteroaryl ring.

The term "halogen" or "halo" as used herein refers to F, Cl, Br or I. In a particular, halogen may be Cl.

The term "substituted" as used herein in reference to a moiety means that one or more, especially up to 5, more especially 1, 2 or 3, of the hydrogen atoms in said moiety are replaced independently of each other by the corresponding number of the described substituents. The term "optionally substituted" as used herein means substituted or unsubstituted.

It will, of course, be understood that substituents are only at positions where they are chemically possible, the person skilled in the art being able to decide (either experimentally or theoretically) without inappropriate effort whether a particular substitution is possible.

Borylimide Catalysts

According to a first aspect of the present invention there is provided a compound of Formula I

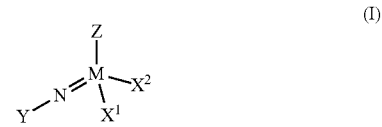

wherein:
M is selected from titanium, zirconium and hafnium;
$X^1$ and $X^2$ are independently selected from halo, hydrogen, a phosphonate, sulfonate or boronate group, amino, (1-6C)alkyl, (1-6C)alkoxy, aryl, aryloxy and heterocycloalkyl (such as THF), wherein said (1-6C) alkyl, (1-6C)alkoxy, aryl and aryloxy groups may be optionally substituted with one of more groups selected from halo, oxo, hydroxy, amino, nitro, (1-6C)alkyl, (2-6C)alkenyl, (2-6C)alkynyl, (1-6C)haloalkyl, (1-6C) alkoxy, aryl and Si[(1-4C)alkyl]₃;
Y is $BR^1R^2$;
Z is a polydentate ligand coordinated to M by at least 2 donor atoms Q, wherein each Q is independently selected from N, O, S and P;
$R^1$ and $R^2$ are independently selected from $NR^3R^4$, $OR^5$, $SR^6$ and $CR^7R^8R_9$; $R^3$, $R^4$, $R^5$, $R^6$, $R^7$, $R^8$ and $R^9$ are independently selected from hydrogen, (1-6C)alkyl, (2-6C)alkenyl, (2-6C)alkynyl, aryl and heteroaryl, wherein said (1-6C)alkyl, (2-6C)alkenyl, (2-6C)alkynyl, aryl and heteroaryl groups are optionally substituted with one or more substituents selected independently from halo, hydroxy, amino, nitro, (1-6C)alkyl and (1-6C)haloalkyl;
or $R^1$ and $R^2$ are linked, such that when taken in combination with the boron atom to which they are attached, they form a group:

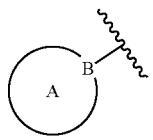

wherein ring A is a carbocyclic or heterocyclic ring, optionally substituted with one or more substituents selected independently from halo, hydroxy, amino, (1-6C)alkyl, (1-6C)alkoxy, (1-6C)haloalkyl, aryl and heteroaryl, wherein said aryl and heteroaryl groups are optionally substituted with one or more substituents selected independently from halo, hydroxy, amino, nitro, (1-6C)alkyl and (1-6C)haloalkyl.

Substituent Y attached to the imido-nitrogen, defines the boryl-imido moiety of the compounds of formula I. The boryl-imido moiety may be cyclic or acyclic in nature. Suitable acyclic boryl-imido moieties comprise carbon-linked or heteroatom-linked substituents attached to boron. In an embodiment, $R^1$ and $R^2$ are independently selected from $NR^3R^4$, $OR^5$, $SR^6$ and $CR^7R^8R^9$. In an embodiment, $R^1$ and $R^2$ are independently selected from $NR^3R^4$, $OR^5$ and $SR^6$. In a further embodiment, $R^1$ and $R^2$ are both $NR^3R^4$. In another embodiment, $R^1$ and $R^2$ are both $NR^3R^4$, and $R^3$ and $R^4$ are independently selected from hydrogen, (1-6C)alkyl, aryl and heteroaryl, wherein said (1-6C)alkyl, aryl and heteroaryl groups are optionally substituted with one or more substituents selected independently from halo, hydroxy, amino, nitro, (1-6C)alkyl and (1-6C)haloalkyl.

Suitable cyclic boryl-imido moieties comprise carbocyclic and/or heterocyclic rings. In an embodiment, $R^1$ and $R^2$ are linked, such that when taken in combination with the boron atom to which they are attached, they form a group:

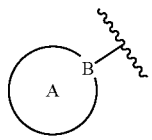

wherein ring A is a carbocyclic or heterocyclic ring, optionally substituted with one or more substituents selected independently from halo, hydroxy, amino, (1-6C)alkyl, (1-6C)alkoxy, (1-6C)haloalkyl, aryl and heteroaryl, wherein said aryl and heteroaryl groups are optionally substituted with one or more substituents selected independently from halo, hydroxy, amino, nitro, (1-6C)alkyl and (1-6C)haloalkyl. Ring A may comprise one or more unsaturated bonds. Ring A may be optionally fused to an aryl or heteroaryl ring.

Preferably, ring A is a heterocyclic ring. In an embodiment, $R^1$ and $R^2$ are linked, such that when taken in combination with the boron atom to which they are attached, they form a group:

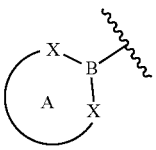

wherein X is a heteroatom chosen from $NR^{10}$, O and S; the heterocyclic ring A is optionally substituted with one or more substituents selected independently from halo, hydroxy, amino, (1-6C)alkyl, (1-6C)alkoxy, (1-6C)haloalkyl, aryl and heteroaryl, wherein said aryl and heteroaryl groups are optionally substituted with one or more substituents selected independently from halo, hydroxy, amino, nitro, (1-6C)alkyl and (1-6C)haloalkyl; and $R^{10}$ is (1-6C)alkyl, aryl or heteroaryl, wherein said (1-6C)alkyl, aryl and heteroaryl groups are optionally substituted with one or more substituents selected independently from halo, hydroxy, amino, nitro, (1-6C) alkyl and (1-6C)haloalkyl.

In an embodiment, $R^1$ and $R^2$ are linked, such that when taken in combination with the boron atom to which they are attached, they form a group:

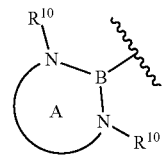

wherein the heterocyclic ring A is optionally substituted with one or more substituents selected independently from halo, hydroxy, amino, (1-6C)alkyl, (1-6C)alkoxy, (1-6C)haloalkyl, aryl and heteroaryl, wherein said aryl and heteroaryl groups are optionally substituted with one or more substituents selected independently from halo, hydroxy, amino, nitro, (1-6C)alkyl and (1-6C)haloalkyl; and each $R^{10}$ is independently (1-6C)alkyl, aryl or heteroaryl, wherein said (1-6C)alkyl, aryl and heteroaryl groups are optionally substituted with one or more substituents selected independently from halo, hydroxy, amino, nitro, (1-6C)alkyl and (1-6C)haloalkyl. In a further embodiment, each $R^{10}$ is independently (1-6C)alkyl or aryl, wherein said aryl group is optionally substituted with one or more substituents selected independently from halo, hydroxy, amino, nitro, (1-6C)alkyl and (1-6C)haloalkyl. In another embodiment, each $R^{10}$ is independently (1-6C)alkyl or aryl, wherein said aryl group is optionally substituted with (1-6C)alkyl or (1-6C)haloalkyl. In an embodiment, ring A is a 5- or 6-membered ring, such as a 5-membered ring.

In an embodiment, Y is selected from one of the following groups:

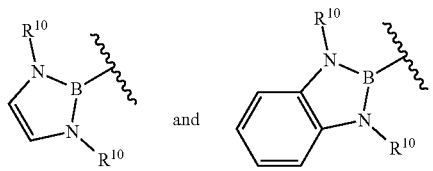

wherein each $R^{10}$ is independently (1-6C)alkyl, aryl or heteroaryl, wherein said (1-6C)alkyl, aryl and heteroaryl groups are optionally substituted with one or more substituents selected independently from halo, hydroxy, amino, nitro, (1-6C)alkyl and (1-6C)haloalkyl. In a further embodiment, each $R^{10}$ is independently (1-6C)alkyl or aryl, wherein said aryl group is optionally substituted with one or more substituents selected independently from halo, hydroxy, amino, nitro, (1-6C)alkyl and (1-6C)haloalkyl. In another embodiment, each $R^{10}$ is independently (1-6C)alkyl or aryl, wherein said aryl group is optionally substituted with (1-6C)

alkyl or (1-6C)haloalkyl. In another embodiment, $R^{10}$ is (1-6C)alkyl, such as methyl, ethyl, propyl or isopropyl. In a preferred embodiment, at both instances, $R^{10}$ is the same (1-6C)alkyl. In a more preferred embodiment, both $R^{10}$ are methyl. In a more preferred embodiment, both $R^{1o}$ are isopropyl.

In an alternative embodiment, $R^{10}$ is an aryl group optionally substituted with one or more substituents selected independently from (1-6C)alkyl and (1-6C)haloalkyl. In a further embodiment, $R^{10}$ is an aryl group substituted with two substituents selected independently from (1-6C)alkyl and (1-6C)haloalkyl. In a yet further embodiment, $R^{10}$ is the following group:

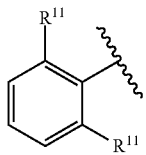

wherein $R^{11}$ is (1-6C)alkyl or (1-6C)haloalkyl, such as (1-6C)alkyl (for example isopropyl).

In a preferred embodiment, Y is selected from one of the following groups:

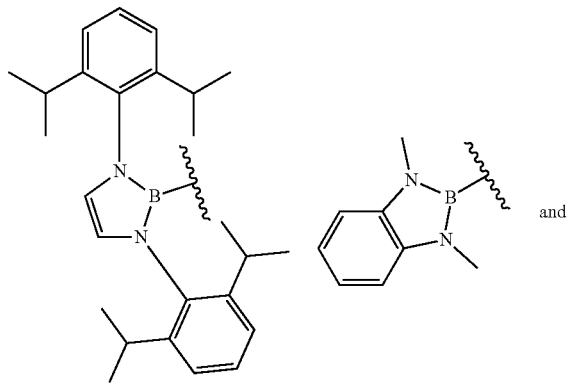

and

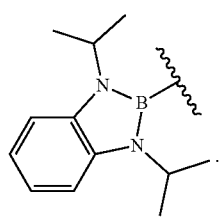

Z is a polydentate ligand coordinated to the metal (M) by at least 2 donor atoms Q, wherein each Q is independently selected from N, O, S and P. The donor atoms Q bind to the metal and accordingly Z may be a bi-, tri-, tetra-, penta- or higher dentate ligand. Each Q atom may be the same or different. In an embodiment, Z is a tri- or tetra-dentate ligand coordinated to M by 3 or 4 donor atoms Q. In a further embodiment, Z is a tridentate ligand coordinated to M by 3 donor atoms Q. In a preferred embodiment, each donor atom Q is N.

In an embodiment, Z is a ligand according to formula II:

(II)

wherein $Q^1$, $Q^2$ and $Q^3$ are $NR^{12}R^{13}$ or a heteroaryl group containing at least one nitrogen atom, said heteroaryl group optionally substituted with one or more substituents selected from halo, hydroxy, amino, nitro, (1-6C)alkyl, (1-6C)alkoxy, -S-(1-6C)alkyl and (1-6C)haloalkyl;

$R^{12}$ and $R_{13}$ are independently absent, hydrogen, (1-20C)alkyl, aryl or heteroaryl as valency permits, wherein said (1-20C)alkyl, aryl and heteroaryl groups are optionally substituted with one or more substituents selected from halo, hydroxy, amino, nitro, (1-6C)alkyl, (1-6C)haloalkyl and aryl;

$L^1$, $L^2$ and $L^3$ are absent, a bond, (1-3C)alkylene or (2-3C)alkenylene, said (1-3C)alkylene or (2-3C)alkenylene moieties being optionally substituted with one or more substituents selected from (1-3C)alkyl, halo, hydroxy, (1-3C)alkoxy, aryl or heteroaryl;

$L^4$ is absent, $CR^{14}$, $[BR^{15}]^-$, (1-3C)alkylene or (2-3C)alkylenylene, said (1-3C)alkylene or (2-3C)alkenylene moieties being optionally substituted with one or more substituents selected from (1-3C)alkyl, halo, hydroxy, (1-3C)alkoxy, aryl or heteroaryl;

$R^{14}$ is absent, hydrogen, (1-6C)alkyl, halo, hydroxy, (1-3C)alkoxy, aryl or heteroaryl; and $R^{15}$ is hydrogen or (1-6C)alkyl.

In an embodiment, when one or more of $L^1$, $L^2$ and $L^3$ are absent, then $L^4$ is $CR^{14}$, $[BR^{15}]^-$, (1-3C)alkylene or (2-3C)alkylenylene, said (1-3C)alkylene or (2-3C)alkenylene moieties being optionally substituted with one or more substituents selected from (1-3C)alkyl, halo, hydroxy, (1-3C)alkoxy, aryl or heteroaryl. In a further embodiment, when $L^1$, $L^2$ and $L^3$ are absent, then $L^4$ is $CR^{14}$ or (1-3C)alkylene said (1-3C)alkylene moiety being optionally substituted with one or more substituents selected from (1-3C)alkyl, halo, hydroxy, (1-3C)alkoxy, aryl or heteroaryl. In an alternative embodiment, when $L^4$ is absent, then $L^1$, $L^2$ and $L^3$ are a bond, (1-3C)alkylene or (2-3C)alkenylene, said (1-3C)alkylene or (2-3C)alkenylene moieties being optionally substituted with one or more substituents selected from (1-3C)alkyl, halo, hydroxy, (1-3C)alkoxy, aryl or heteroaryl.

In an embodiment, $Q^1$, $Q^2$ and $Q^3$ are $NR^{12}R^{13}$. The nitrogen atom of $Q^1$, $Q^2$ or $Q^3$ has the standard tri-valency of nitrogen. Therefore, as valency permits, and depending on how many linker groups ($L^1$, $L^2$, $L^3$ and $L^4$) any given nitrogen atom is bonded to, then either none, one or both of $R^{12}$ and $R_{13}$ may be absent. For example, if $Q^1$ is bonded to $L^1$, $L^3$ and $L^4$, then both of $R^{12}$ and $R_{13}$ are absent; if $Q^1$ is bonded to $L^1$ and $L^3$, but $L^4$ is absent, then one of $R^{12}$ and $R_{13}$ is absent; if $Q^1$ is bonded to $L^4$, but $L^1$ and $L^3$ are absent, then neither of $R^{12}$ or $R^{13}$ is absent.

In an embodiment, $L^4$ is $CR^{14}$ and $R^{14}$ is either absent, hydrogen, (1-6C)alkyl, halo, hydroxy, (1-3C)alkoxy, aryl or heteroaryl. When $R^{14}$ is absent, then $L^4$ is C—. In other words, the carbon atom bears a negative charge. In an embodiment, $L^4$ is $CR^{14}$ and $R^{14}$ is hydrogen. In an embodiment, $L^4$ is $[BR^{15}]^-$ and $R^{15}$ is hydrogen or (1-6C)alkyl, such as hydrogen. When $L^4$, and therefore as a consequence the ligand Z, bears a negative charge, then to balance the charges in the compound of Formula I, $X^1$ or $X^2$ is a neutral ligand, for example heterocycloalkyl (such as THF).

In an embodiment, Z is a ligand of formula IIA or IIB:

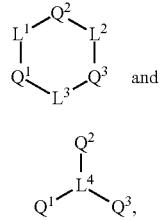

(IIA)

(IIB)

wherein $Q^1$, $Q^2$ and $Q^3$ are $NR^{12}R^{13}$ or a heteroaryl group containing at least one nitrogen atom, said heteroaryl group optionally substituted with one or more substituents selected from halo, hydroxy, amino, nitro, (1-6C)alkyl, (1-6C)alkoxy, -S-(1-6C)alkyl and (1-6C)haloalkyl;

$R^{12}$ and $R_{13}$ are independently absent, hydrogen, (1-20C)alkyl, aryl or heteroaryl as valency permits, wherein said (1-20C)alkyl, aryl and heteroaryl groups are optionally substituted with one or more substituents selected from halo, hydroxy, amino, nitro, (1-6C)alkyl, (1-6C)haloalkyl and aryl;

$L^1$, $L^2$ and $L^3$ are a bond, (1-3C)alkylene or (2-3C)alkenylene, said (1-3C)alkylene or (2-3C)alkenylene moieties being optionally substituted with one or more substituents selected from (1-3C)alkyl, halo, hydroxy, (1-3C)alkoxy, aryl or heteroaryl; and $L^4$ is $CR^{14}$, (1-3C)alkylene or (2-3C)alkylenylene, said (1-3C)alkylene or (2-3C)alkenylene moieties being optionally substituted with one or more substituents selected from (1-3C)alkyl, halo, hydroxy, (1-3C)alkoxy, aryl or heteroaryl.

In an embodiment, Z is a ligand of formula IIA and $L^1$, $L^2$ and $L^3$ are (1-3C)alkylene.

In an embodiment, Z is a ligand of formula IIA, $Q^1$, $Q^2$ and $Q^3$ are $NR^{12}$ and $L^1$, $L^2$ and $L^3$ are (1-3C)alkylene.

In an embodiment, Z is a ligand of formula IIC:

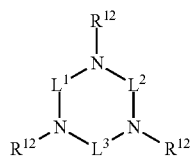

(IIC)

wherein $L^1$, $L^2$ and $L^3$ are (1-3C)alkylene optionally substituted with one or more substituents selected from (1-3C)alkyl, halo, hydroxy, (1-3C)alkoxy, aryl or heteroaryl;

and each $R^{12}$ is independently (1-20C)alkyl optionally substituted with one or more substituents selected from halo, hydroxy, amino, nitro, (1-6C)alkyl, (1-6C)haloalkyl and aryl.

In an embodiment, Z is a ligand of formula IIC, $L^1$, $L^2$ and $L^3$ are (1-3C)alkylene and each $R^{12}$ is independently (1-20C)alkyl.

In an embodiment, Z is the ligand of formula IIB:

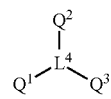

(IIB)

wherein $L^4$ is $CR^{14}$, (1-3C)alkylene or (2-3C)alkylenylene, said (1-3C)alkylene or (2-3C)alkenylene moieties being optionally substituted with one or more substituents selected from (1-3C)alkyl, halo, hydroxy, (1-3C)alkoxy, aryl or heteroaryl; and $Q^1$, $Q^2$ and $Q^3$ are heteroaryl groups containing at least one nitrogen atom, said heteroaryl groups being optionally substituted with one or more substituents selected from halo, hydroxy, amino, nitro, (1-6C)alkyl and (1-6C)haloalkyl.

In an embodiment, Z is the ligand of formula IIB and $L^4$ is $CR^{14}$. In a preferred embodiment, $R^{14}$ is hydrogen.

In an embodiment, Z is the ligand of formula IIB and $Q^1$, $Q^2$ and $Q^3$ are pyrazolyl or pyridinyl groups optionally substituted with one or more substituents selected from halo, (1-6C)alkyl and (1-6C)haloalkyl. In a preferred embodiment, $Q^1$, $Q^2$ and $Q^3$ are pyrazolyl groups substituted with one or more (1-6C)alkyl substituents.

In an embodiment, Z is the ligand of formula IIB, $L^4$ is $CR^{14}$ and $Q^1$, $Q^2$ and $Q^3$ are pyrazolyl or pyridinyl groups optionally substituted with one or more substituents selected from halo, (1-6C)alkyl and (1-6C)haloalkyl.

In an embodiment, Z is selected from one of the following ligands:

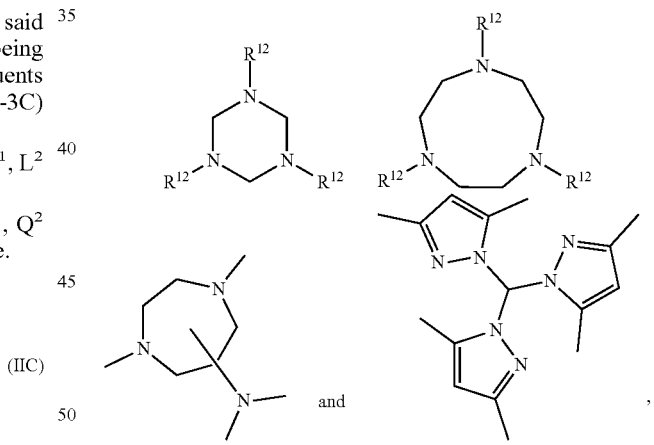

wherein $R^{12}$ is (1-20C)alkyl optionally substituted with one or more substituents selected from halo, hydroxy, amino, nitro, (1-6C)alkyl, (1-6C)haloalkyl and aryl.

In an embodiment, Z is selected from one of the following ligands:

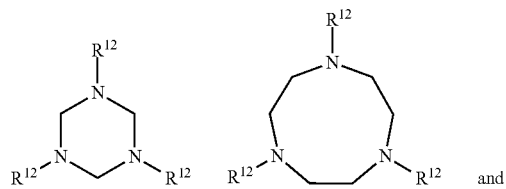

-continued

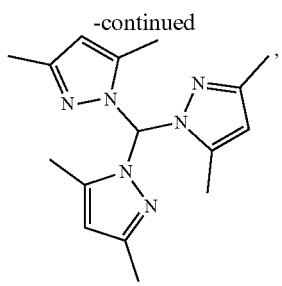

wherein R¹² is (1-20C)alkyl optionally substituted with one or more substituents selected from halo, hydroxy, amino, nitro, (1-6C)alkyl, (1-6C)haloalkyl and aryl.

In an embodiment, Z is selected from one of the following ligands:

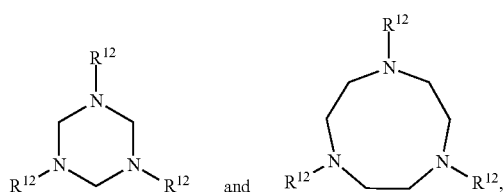

wherein R¹² is (1-20C)alkyl optionally substituted with phenyl. In an embodiment, all R¹² substituents are methyl, hexyl, dodecyl or benzyl (i.e. all three R¹² groups are methyl, or all three R¹² groups are hexyl, or all three R¹² groups are dodecyl, or all three R¹² groups are benzyl). In preferred embodiment, all R¹² substituents are methyl.

The metal, M, is a Group IV transition metal selected from titanium, zirconium and hafnium. In a preferred embodiment, M is titanium.

The ligands X¹ and X² are independently selected from halo, hydrogen, a phosphonate, sulfonate or boronate group, amino, (1-6C)alkyl, (1-6C)alkoxy, aryl, aryloxy and heterocycloalkyl (such as THF), wherein said (1-6C)alkyl, (1-6C) alkoxy, aryl and aryloxy groups may be optionally substituted with one of more groups selected from halo, oxo, hydroxy, amino, nitro, (1-6C)alkyl, (2-6C)alkenyl, (2-6C) alkynyl, (1-6C)haloalkyl, (1-6C)alkoxy, aryl and Si[(1-4C) alkyl]₃. In an embodiment, X¹ and X² are independently selected from halo, hydrogen, a phosphonate, sulfonate or boronate group, amino, (1-6C)alkyl, (1-6C)alkoxy, aryl, aryloxy and heterocycloalkyl. In an embodiment, X¹ and X² are independently selected from halo, hydrogen, a phosphonate, (1-6C)alkyl, (1-6C)alkoxy, aryl, aryloxy and heterocycloalkyl. In an embodiment, X¹ and X² are independently selected from halo, (1-6C)alkyl and (1-6C)alkoxy. In a preferred embodiment, X¹ and X² are independently selected from chloro and methyl. In a further preferred embodiment, X¹ and X² are both chloro.

In an embodiment, the compound of formula I is selected from one of the following compounds:

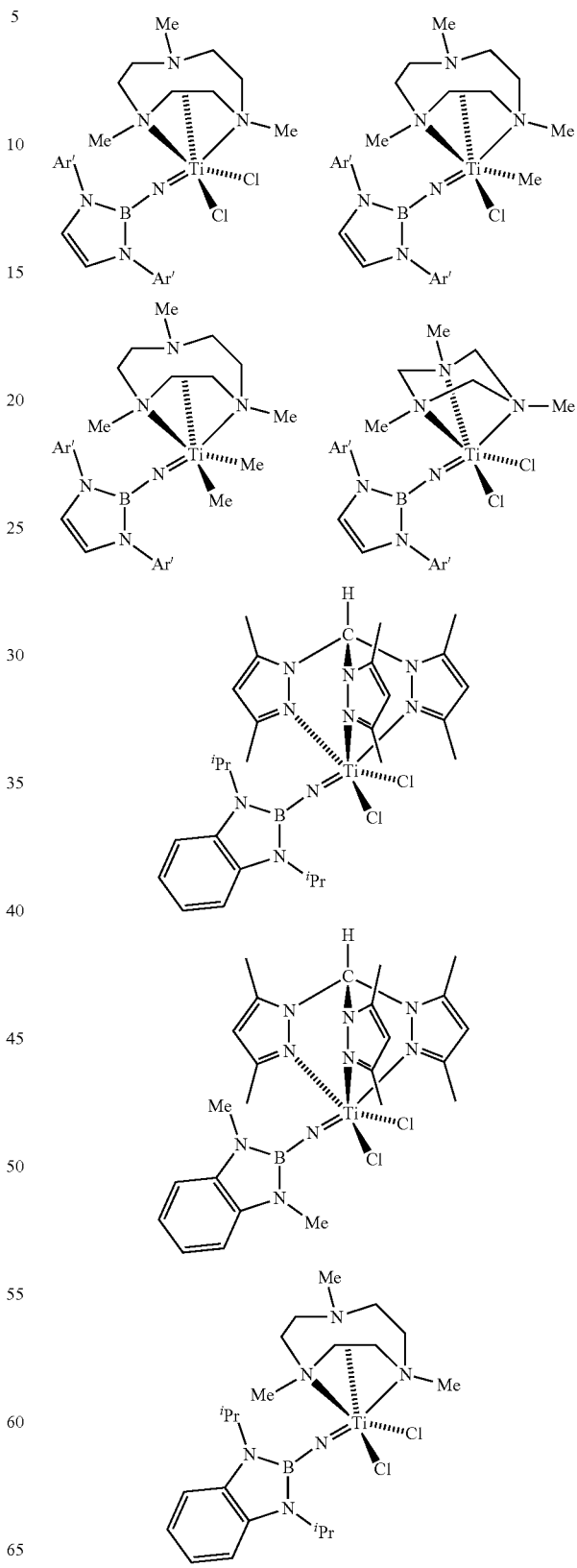

-continued
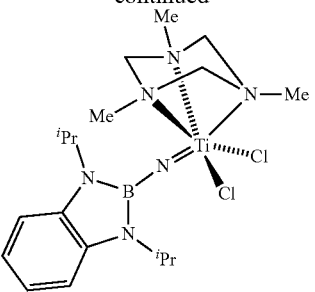
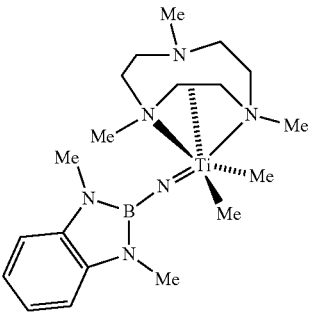
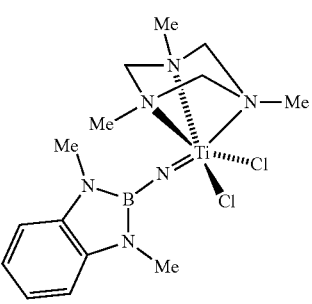
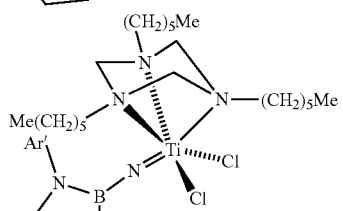
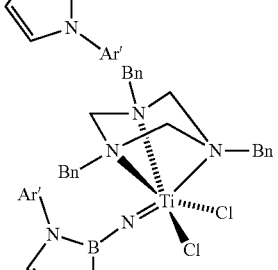
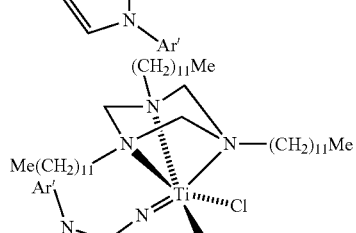
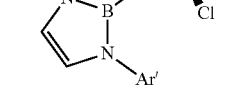
-continued
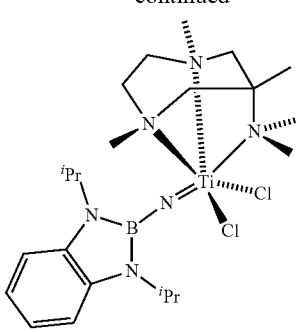
and
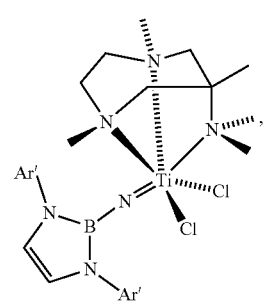
wherein Ar' is
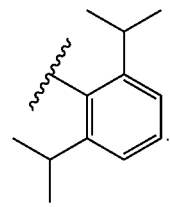 [SMILES: *c1c(C(C)C)cccc1C(C)C]
In an embodiment, the compound of formula I is selected from one of the following compounds:
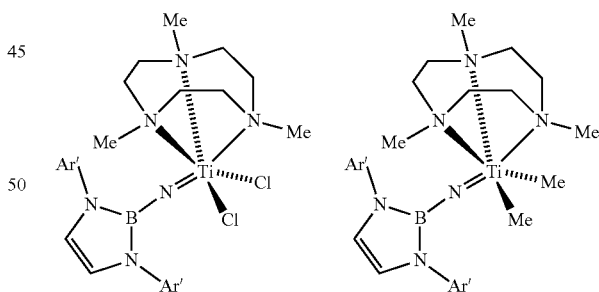
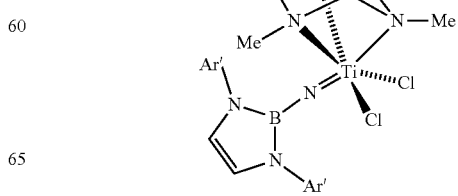

-continued

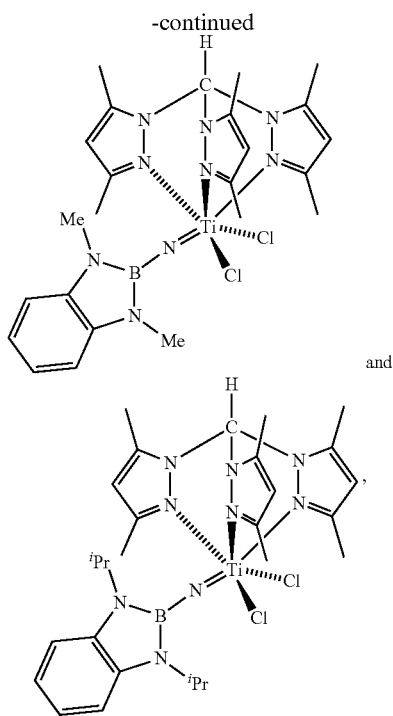

wherein Ar' is

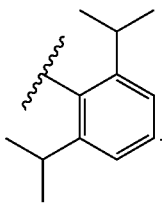 [SMILES: *c1c(C(C)C)cccc1C(C)C]

The present invention encompasses compounds according to formula I, both with an overall net charge of zero, and those compounds that have an overall net charge other than zero and therefore further comprise a suitable counterion.

Compositions

In a further aspect of the present invention, there is provided a composition comprising a compound of formula I, as described herein, immobilised on a solid support material.

It will be appreciated that the compound may be immobilised on the solid support material by one or more covalent or ionic interactions, either directly, or via a suitable linking moiety. It will be appreciated that minor structural modifications resulting from the immobilisation of the compound on the support material (e.g. loss of one or both of the $X^1$ and $X^2$ groups) are nonetheless within the scope of the invention. Suitably, the solid support material is selected from silica, alumina, zeolite, layered double hydroxide, methylaluminoxane-activated silica, methylaluminoxane-activated layered double hydroxide and solid methylaluminoxane. Most suitably, the solid support material is solid methylaluminoxane.

The terms "solid MAO", "sMAO" and "solid polymethylaluminoxane" are used synonymously herein to refer to a solid methylaluminoxane material having the general formula —[(Me) AlO]$_n$—, wherein n is an integer from 4 to 50 (e.g. 10 to 50). Any suitable solid methylaluminoxane may be used.

There exist numerous substantial structural and behavioural differences between solid polymethylaluminoxane and other non-solid MAOs. Perhaps most notably, solid polymethylaluminoxane is distinguished from other MAOs as it is insoluble in hydrocarbon solvents and so typically acts as a heterogeneous support system for carrying out slurry phase olefin polymerisations. The solid polymethylaluminoxane useful in the compositions of the invention are insoluble in toluene and hexane.

In an embodiment, the aluminium content of the solid polymethylaluminoxane falls within the range of 36-41 wt %.

The solid polymethylaluminoxane useful as part of the present invention is characterised by extremely low solubility in toluene and n-hexane. In an embodiment, the solubility in n-hexane at 25° C. of the solid polymethylaluminoxane is 0-2 mol %. Suitably, the solubility in n-hexane at 25° C. of the solid polymethylaluminoxane is 0-1 mol %. More suitably, the solubility in n-hexane at 25° C. of the solid polymethylaluminoxane is 0-0.2 mol %. Alternatively, or additionally, the solubility in toluene at 25° C. of the solid polymethylaluminoxane is 0-2 mol %. Suitably, the solubility in toluene at 25° C. of the solid polymethylaluminoxane is 0-1 mol %. More suitably, the solubility in toluene at 25° C. of the solid polymethylaluminoxane is 0-0.5 mol %. The solubility in solvents can be measured by the method described in JP-B (KOKOKU)-H07 42301.

Olefin Polymerisation Processes

In a further aspect of the present invention, there is provided a process for the polymerisation of at least one olefin, the process comprising the step of contacting the at least one olefin with a compound or composition of the invention, as described herein.

In an embodiment, the at least one olefin is at least one (2-10C)alkene.

In an embodiment, the at least one olefin is at least one α-olefin.

In an embodiment, the at least one olefin is ethene and optionally one or more other (3-10C)alkenes. When the optional one or more other (3-10C)alkenes is present, the polymerisation process is a copolymerisation process. Suitable optional one or more other (3-10C)alkenes include 1-hexene, styrene and methyl methacrylate.

In an embodiment, the polymerisation process is a homopolymerisation process and the at least one olefin is ethene.

In an embodiment, the process is conducted in a solvent selected from toluene, hexane and heptane.

In an embodiment, the process is conducted for a period of 1 minute to 96 hours. Suitably, the process is conducted for a period of 5 minutes to 72 hours, such as 5 minutes to 4 hours.

In an embodiment, the process is conducted at a pressure of 0.9 to 10 bar. Suitably, the process is conducted at a pressure of 1.5 to 3 bar.

In an embodiment, the process is conducted at a temperature of 15 to 120° C. Suitably, the process is conducted at a temperature of 40 to 100° C. In an embodiment, the process is conducted at a temperature of 15 to 30° C. In an alternative embodiment, the polymerisation process comprises the step of contacting the at least one olefin with a composition comprising a compound of the invention immobilised on a solid support material, at a temperature of either 50° C., 60° C. or 70° C.

In an embodiment, the process is conducted in the presence of a co-catalyst. Suitably, the co-catalyst is one or more organoaluminium compounds. More suitably, the one or more organoaluminium compounds are selected from alkylaluminoxane (e.g. methylaluminiumoxane), triisobutylaluminium and triethylaluminium.

The person skilled in the art will realise that further additives may optionally be included in the olefin polymerisation process, such as additional scavengers, stabilisers or carriers.

Polymerisation processes according to this invention may be undertaken as slurry phase or solution phase processes. The use of a compound according to formula (I) immobilised on a solid support material is preferred for slurry phase processes, whereas a non-supported catalyst compound according to formula (I) is preferred for solution phase processes.

In a further aspect, the invention provides a polyolefin directly obtained by, obtained by or obtainable by a process as described herein. The catalyst compounds according to formula I, when used in a process as described herein, give rise to polyolefins (such as polyethylenes) with high molecular weight and/or low polydispersity (as demonstrated by a relatively low $M_w/M_n$ value). In an embodiment, the polyolefin has an average molecular weight greater than $1\times10^6$ g/mol, such as greater than $2\times10^6$ g/mol, preferably greater than $3\times10^6$ g/mol. In an embodiment, the polyolefin has a $M_w/M_n$ value less than 15, such as less than 10, preferably less than 5. In an embodiment, the polyolefin has an average molecular weight greater than $1\times10^6$ g/mol and a $M_w/M_n$ value less than 15. In a further embodiment, the polyolefin has an average molecular weight greater than $2\times10^6$ g/mol and a $M_w/M_n$ value less than 10. In a preferred embodiment, the polyolefin has an average molecular weight greater than $3\times10^6$ g/mol and a $M_w/M_n$ value less than 5.

The following numbered statements 1-48 are not claims, but instead describe various aspects and embodiments of the invention:

1. A compound of Formula I:

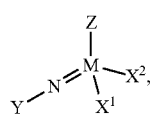

wherein:
M is selected from titanium, zirconium and hafnium;
$X^1$ and $X^2$ are independently selected from halo, hydrogen, a phosphonate, sulfonate or boronate group, amino, (1-6C)alkyl, (1-6C)alkoxy, aryl, aryloxy and heterocycloalkyl (such as THF), wherein said (1-6C) alkyl, (1-6C)alkoxy, aryl and aryloxy groups may be optionally substituted with one of more groups selected from halo, oxo, hydroxy, amino, nitro, (1-6C)alkyl, (2-6C)alkenyl, (2-6C)alkynyl, (1-6C)haloalkyl, (1-6C)alkoxy, aryl and Si[(1-4C)alkyl]$_3$;
Y is $BR^1R^2$;
Z is a polydentate ligand coordinated to M by at least 2 donor atoms Q, wherein each Q is independently selected from N, O, S and P;
$R^1$ and $R^2$ are independently selected from $NR^3R^4$, $OR^5$, $SR^6$ and $CR^7R^8R_9$;
$R^3$, $R^4$, $R^5$, $R^6$, $R^7$, $R^8$ and $R^9$ are independently selected from hydrogen, (1-6C)alkyl, (2-6C)alkenyl, (2-6C)alkynyl, aryl and heteroaryl, wherein said (1-6C)alkyl, (2-6C)alkenyl, (2-6C)alkynyl, aryl and heteroaryl groups are optionally substituted with one or more substituents selected independently from halo, hydroxy, amino, nitro, (1-6C)alkyl and (1-6C)haloalkyl;
or $R^1$ and $R^2$ are linked, such that when taken in combination with the boron atom to which they are attached, they form a group:

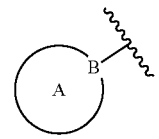

wherein ring A is a carbocyclic or heterocyclic ring, optionally substituted with one or more substituents selected independently from halo, hydroxy, amino, (1-6C)alkyl, (1-6C)alkoxy, (1-6C)haloalkyl, aryl and heteroaryl, wherein said aryl and heteroaryl groups are optionally substituted with one or more substituents selected independently from halo, hydroxy, amino, nitro, (1-6C)alkyl and (1-6C)haloalkyl.

2. The compound according to statement 1, wherein $R^1$ and $R^2$ are independently selected from $NR^3R^4$, $OR^5$ and $SR^6$.

3. The compound according to statement 1, wherein $R^1$ and $R^2$ are both $NR^3R^4$ 4. The compound according to statement 1, wherein $R^1$ and $R^2$ are linked, such that when taken in combination with the boron atom to which they are attached, they form a group:

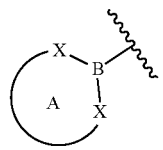

wherein X is a heteroatom chosen from $NR^{10}$, O and S; the heterocyclic ring A is optionally substituted with one or more substituents selected independently from halo, hydroxy, amino, (1-6C)alkyl, (1-6C)alkoxy, (1-6C)haloalkyl, aryl and heteroaryl, wherein said aryl and heteroaryl groups are optionally substituted with one or more substituents selected independently from halo, hydroxy, amino, nitro, (1-6C)alkyl and (1-6C)haloalkyl; and
$R^{10}$ is (1-6C)alkyl, aryl or heteroaryl, wherein said (1-6C) alkyl, aryl and heteroaryl groups are optionally substituted with one or more substituents selected independently from halo, hydroxy, amino, nitro, (1-6C)alkyl and (1-6C)haloalkyl.

5. The compound according to statement 1, wherein $R^1$ and $R^2$ are linked, such that when taken in combination with the boron atom to which they are attached, they form a group:

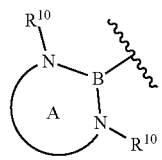

wherein the heterocyclic ring A is optionally substituted with one or more substituents selected independently from halo, hydroxy, amino, (1-6C)alkyl, (1-6C)alkoxy, (1-6C)haloalkyl, aryl and heteroaryl, wherein said aryl and heteroaryl groups are optionally substituted with one or more substituents selected independently from halo, hydroxy, amino, nitro, (1-6C)alkyl and (1-6C) haloalkyl; and each $R^{10}$ is independently (1-6C)alkyl, aryl or heteroaryl, wherein said (1-6C)alkyl, aryl and heteroaryl groups are optionally substituted with one or more substituents selected independently from halo, hydroxy, amino, nitro, (1-6C)alkyl and (1-6C)haloalkyl.

6. The compound according to statement 1, wherein Y is selected from one of the following groups:

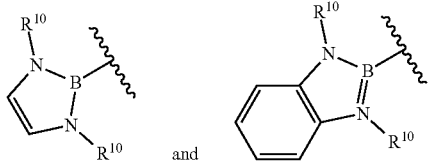

wherein each $R^{10}$ is independently (1-6C)alkyl, aryl or heteroaryl, wherein said (1-6C)alkyl, aryl and heteroaryl groups are optionally substituted with one or more substituents selected independently from halo, hydroxy, amino, nitro, (1-6C)alkyl and (1-6C)haloalkyl.

7. The compound according to statements 4 to 6, wherein $R^{1o}$ is an aryl group optionally substituted with one or more substituents selected independently from (1-6C) alkyl and (1-6C)haloalkyl.

8. The compound according to statements 4 to 7, wherein $R^{10}$ is the following group:

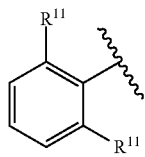

wherein $R^{11}$ is (1-6C)alkyl.

9. The compound according to statement 8, wherein both $R^{11}$ are isopropyl.

10. The compound according to statements 4 to 6, wherein $R^{10}$ is (1-6C)alkyl.

11. The compound according to statement 10, wherein $R^{10}$ is methyl, ethyl, propyl or isopropyl.

12. The compound according to statements 4 to 6, wherein both $R^{10}$ are methyl.

13. The compound according to statements 4 to 6, wherein both $R^{1o}$ are isopropyl.

14. The compound according to any one of statements 1 to 13, wherein Z is a tri- or tetra-dentate ligand coordinated to M by 3-4 donor atoms Q.

15. The compound according to statement 14, wherein Z is a tridentate ligand coordinated to M by 3 donor atoms Q.

16. The compound according to statement 14 or statement 15, wherein each donor atom Q is N.

17. The compound according to statements 1 to 16, wherein Z is the ligand according to formula II:

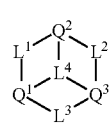

(II)

wherein $Q^1$, $Q^2$ and $Q^3$ are $NR^{12}R^{13}$ or a heteroaryl group containing at least one nitrogen atom, said heteroaryl group optionally substituted with one or more substituents selected from halo, hydroxy, amino, nitro, (1-6C) alkyl, (1-6C)alkoxy, -S-(1-6C)alkyl and (1-6C)haloalkyl;

$R^{12}$ and $R_{13}$ are independently absent, hydrogen, (1-20C) alkyl, aryl or heteroaryl as valency permits, wherein said (1-20C)alkyl, aryl and heteroaryl groups are optionally substituted with one or more substituents selected from halo, hydroxy, amino, nitro, (1-6C)alkyl, (1-6C)haloalkyl and aryl;

$L^1$, $L^2$ and $L^3$ are absent, a bond, (1-3C)alkylene or (2-3C)alkenylene, said (1-3C)alkylene or (2-3C)alkenylene moieties being optionally substituted with one or more substituents selected from (1-3C)alkyl, halo, hydroxy, (1-3C)alkoxy, aryl or heteroaryl;

$L^4$ is absent, $CR^{14}$, $[BR^{15}]^-$, (1-3C)alkylene or (2-3C) alkylenylene, said (1-3C)alkylene or (2-3C)alkenylene moieties being optionally substituted with one or more substituents selected from (1-3C)alkyl, halo, hydroxy, (1-3C)alkoxy, aryl or heteroaryl; $R^{14}$ is absent, hydrogen, (1-6C)alkyl, halo, hydroxy, (1-3C)alkoxy, aryl or heteroaryl; and $R^{15}$ is hydrogen or (1-6C)alkyl.

18. The compound according to statement 17, wherein Z is a ligand of formula IIA or IIB:

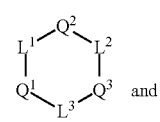

(IIA)

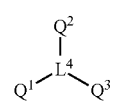

(IIB)

wherein $L^1$, $L^2$ and $L^3$ are a bond, (1-3C)alkylene or (2-3C)alkenylene, said (1-3C)alkylene or (2-3C)alkenylene moieties being optionally substituted with one or more substituents selected from (1-3C)alkyl, halo, hydroxy, (1-3C)alkoxy, aryl or heteroaryl; and $L^4$ is $CR^{14}$, (1-3C)alkylene or (2-3C)alkylenylene, said (1-3C)alkylene or (2-3C)alkenylene moieties being optionally substituted with one or more substituents selected from (1-3C)alkyl, halo, hydroxy, (1-3C) alkoxy, aryl or heteroaryl.

19. The compound according to statement 18, wherein Z is the ligand of formula IIC:

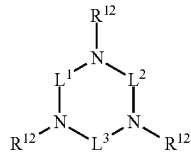
(IIC)

wherein each $R^{12}$ is independently (1-20C)alkyl optionally substituted with one or more substituents selected from halo, hydroxy, amino, nitro, (1-6C)alkyl, (1-6C)haloalkyl and aryl.

20. The compound according to statement 18, wherein Z is the ligand of formula IIB:

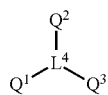
(IIB)

wherein
$Q^1$, $Q^2$ and $Q^3$ are heteroaryl groups containing at least one nitrogen atom, said heteroaryl groups being optionally substituted with one or more substituents selected from halo, hydroxy, amino, nitro, (1-6C)alkyl and (1-6C)haloalkyl.

21. The compound according to statement 20, wherein $L^4$ is $CR^{14}$.

22. The compound according to statement 21, wherein $R^{14}$ is hydrogen.

23. The compound according to statements 20 to 22, wherein $Q^1$, $Q^2$ and $Q^3$ are pyrazolyl or pyridinyl groups optionally substituted with one or more substituents selected from halo, (1-6C)alkyl and (1-6C)haloalkyl.

24. The compound according to statements 1 to 13, wherein Z is selected from one of the following ligands:

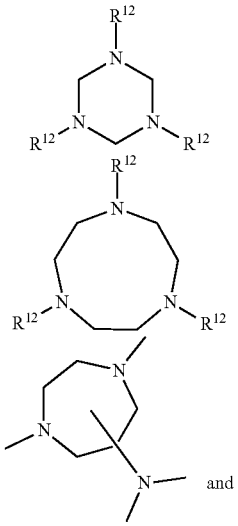

and

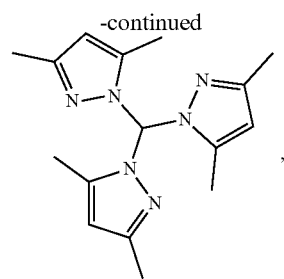

, wherein $R^{12}$ is (1-20C)alkyl optionally substituted with one or more substituents selected from halo, hydroxy, amino, nitro, (1-6C)alkyl, (1-6C)haloalkyl and aryl.

25. The compound according to statements 1 to 13, wherein Z is selected from one of the following ligands:

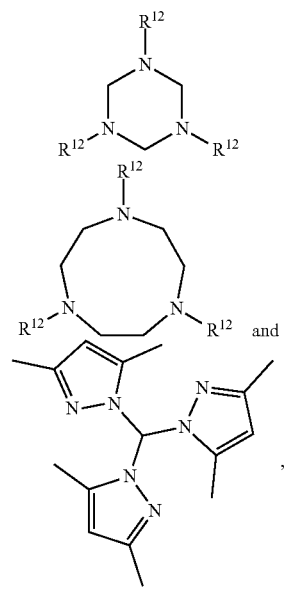

and

, wherein $R^{12}$ is (1-20C)alkyl optionally substituted with one or more substituents selected from halo, hydroxy, amino, nitro, (1-6C)alkyl, (1-6C)haloalkyl and aryl.

26. The compound according to statements 1 to 13, wherein Z is selected from one of the following polydentate ligands:

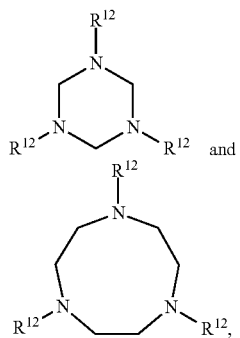

and

, wherein $R^{12}$ is (1-20C)alkyl optionally substituted with phenyl.

27. The compound according to statement 26, wherein all $R^{12}$ substituents are methyl, hexyl, dodecyl or benzyl.

28. The compound according to statement 27, wherein all $R^{12}$ substituents are methyl.

29. The compound according to any one of statements 1 to 28, wherein M is titanium.

30. The compound according to any one of statements 1 to 29, wherein $X^1$ and $X^2$ are independently selected from halo, hydrogen, a phosphonate, sulfonate or boronate group, amino, (1-6C)alkyl, (1-6C)alkoxy, aryl, aryloxy and heterocycloalkyl.

31. The compound according to any one of statements 1 to 29, wherein $X^1$ and $X^2$ are independently selected from halo, (1-6C)alkyl and (1-6C)alkoxy.

32. The compound according to any one of statements 1 to 29, wherein $X^1$ and $X^2$ are independently selected from chloro and methyl.

33. The compound according to any one of statements 1 to 29, wherein $X^1$ and $X^2$ are both chloro.

34. A composition comprising a compound according to any one of statements 1 to 33 immobilised on a solid support material.

35. The composition according to statement 34, wherein the solid support material is selected from silica, alumina, zeolite, layered double hydroxide, methylaluminoxane-activated silica, methylaluminoxane-activated layered double hydroxide and solid methylaluminoxane.

36. The composition according to statement 34, wherein the solid support material is solid methylaluminoxane.

37. The compound according to any one of statements 1 to 33, or the composition according to any one of statements 34 to 36, which when used as a catalyst in the polymerisation of ethylene is capable of producing polyethylene with a mass average molecular weight ($M_w$) of greater than $1.1 \times 10^6$ g/mol, such as greater than $1.5 \times 10^6$ g/mol, or greater than $2.5 \times 10^6$ g/mol.

38. The compound according to any one of statements 1 to 33, or the composition according to any one of statements 34 to 36, which when used as a catalyst in the polymerisation of ethylene is capable of producing polyethylene with a polydispersity index ($M_w/M_n$) of less than 10, such as less than 7, or less than 5.

39. The compound according to any one of statements 1 to 33, or the composition according to any one of statements 34 to 36, which when used as a catalyst in the polymerisation of ethylene is capable of producing polyethylene with a mass average molecular weight ($M_w$) of greater than $1.1 \times 10^6$ g/mol and a polydispersity index ($M_w/M_n$) of less than 10, such as a mass average molecular weight ($M_w$) of greater than $1.5 \times 10^6$ g/mol and a polydispersity index ($M_w/M_n$) of less than 7, or a mass average molecular weight ($M_w$) of greater than $2.5 \times 10^6$ g/mol and a polydispersity index ($M_w/M_n$) of less than 5.

40. The compound or the composition according to any one of statements 37 to 39, wherein the catalyst is supported on solid methylaluminoxane and the ethylene polymerisation is carried out under the following slurry-phase conditions:

10 mg of supported catalyst is heated with 150 mg of triisobutylaluminium in 50 ml of hexane at 60° C. or 70° C. under 3 bar dynamic pressure of ethylene for 15 minutes.

41. A process for the polymerisation of at least one olefin, the process comprising the step of contacting the at least one olefin with a compound according to any one of statements 1 to 33, or a composition according to any one of statements 34 to 36.

42. The process according to statement 41, wherein the at least one olefin is at least one (2-10C)alkene.

43. The process according to statement 41 or statement 42, wherein the at least one olefin is at least one α-olefin.

44. The process according to statement 41, wherein the at least one olefin is ethene and optionally one or more other (3-10C)alkenes (e.g. 1-hexene, styrene and/or methyl methacrylate).

45. The process according to statement 41, wherein the at least one olefin is ethene.

46. The process according to any one of statements 41 to 45, wherein the process is conducted in the presence of a co-catalyst.

47. The process of statement 46, wherein the co-catalyst is one or more organoaluminium compounds.

48. The process of statement 47, wherein the one or more organoaluminium compounds are selected from methylaluminoxane, triisobutylaluminium and triethylaluminium.

EXAMPLES

Materials and Methods

All manipulations were carried out using standard Schlenk line or dry-box techniques under an atmosphere of argon or dinitrogen. Solvents were either degassed by sparging with dinitrogen and dried by passing through a column of the appropriate drying agent (Pangborn et al., Organometallics, 1996, 15, 1518-1520) or refluxed over sodium (toluene), potassium (THF), Na/K alloy ($Et_2O$) or $CaH_2$ (pyridine) and distilled. All dry solvents were stored under nitrogen and degassed by several freeze-pump-thaw cycles.

$Me_3[6]$ $aneN_3$ (1,3,5-trimethyl-1,3,5-triazinane) and $Me_3[9]$ $aneN_3$ (1,4,7-trimethyl-1,4,7-triazonane) were prepared according to Köhn et al., Inorg. Chem., 1997, 36, 6064-6069 and WO1994/000439. $Hex_3[6]$ $aneN_3$ (1,3,5-trihexyl-1,3,5-triazinane) and $DD_3[6]$ $aneN_3$ (1,3,5-tridodecyl-1,3,5-triazinane) were prepared according to Hoerr et al., J. Am. Chem. Soc., 1956, 78, 4667-4670. $Bn_3[6]$ $aneN_3$ (1,3,5-tribenzyl-1,3,5-triazinane) was prepared according to Köhn et al., Eur. J. Inorg. Chem., 2005, 4, 3217-3223. $Me_4DACH$ (N,N,1,4,6-pentamethyl-1,4-diazepan-6-amine) was prepared according to Ge et al., Chem. Commun., 2006, 3320-3322. HC($Me_2pz)_3$ (tris(3,5-dimethyl-1H-pyrazol-1-yl) methane) was prepared according to Reger et al., J. Organomet. Chem., 2000, 607, 120-128.

$^1H$, $^{13}C\{^1H\}$ and $^{11}B\{^1H\}$ spectra were recorded on a Bruker Ascend 400 NMR spectrometer, a Bruker Avance III 500 NMR spectrometer or on a Bruker AVC 500 spectrometer fitted with a $^{13}C$ cryoprobe. Unless otherwise stated, all NMR spectra were recorded at 298 K. $^1H$ and $^{13}C\{^1H\}$ and spectra were referenced internally to residual protio-solvent ($^1H$) or solvent ($^{13}C$) resonances and are reported relative to tetramethylsilane (δ=0 ppm). $^{11}B$ NMR spectra were referenced externally to $Et_2O \cdot BF_3$. Assignments were confirmed as necessary with the use of two dimensional $^1H$-1H and 13C-1H correlation experiments. Chemical shifts are quoted in δ (ppm) and coupling constants in Hz. Elemental analysis was carried out to confirm the overall composition of the materials.

Synthesis of Catalyst Precursors

Intermediate 1

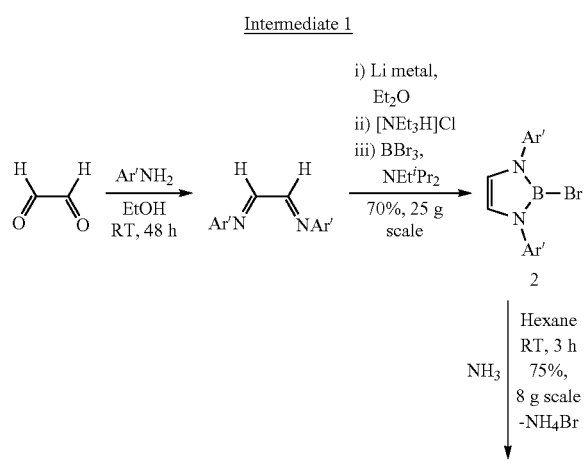

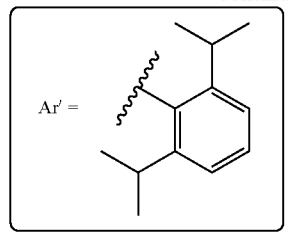

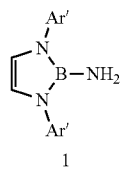

A convenient large-scale and high-yielding synthesis of the borylamine $H_2NB(NAr'CH)_2$ (Intermediate 1) was reported by Jones and co-workers (Hadlington et al., *Chem. Commun.*, 2016, 52, 1717-1720). Ammonia gas was bubbled through a hexane solution of the 1,3,2-diazaborolyl bromide precursor $BrB(NAr'CH)_2$ (2). The resulting borylamine 1 was easily separated from the $NH_4Br$ by-product by filtration, to isolate 1 in 75% yield. The 1,3,2-diazaborolyl bromide precursor itself is prepared ultimately from the commercially available materials glyoxal, $H_2NAr'$ and $BBr_3$ in the sequence of steps shown above and as described in the literature (Jafarpour et al., *J. Organomet. Chem.*, 2000, 606, 49-54; Segawaki et al., *J. Am. Chem. Soc.*, 2008, 130, 16069-16079).

Intermediate 3

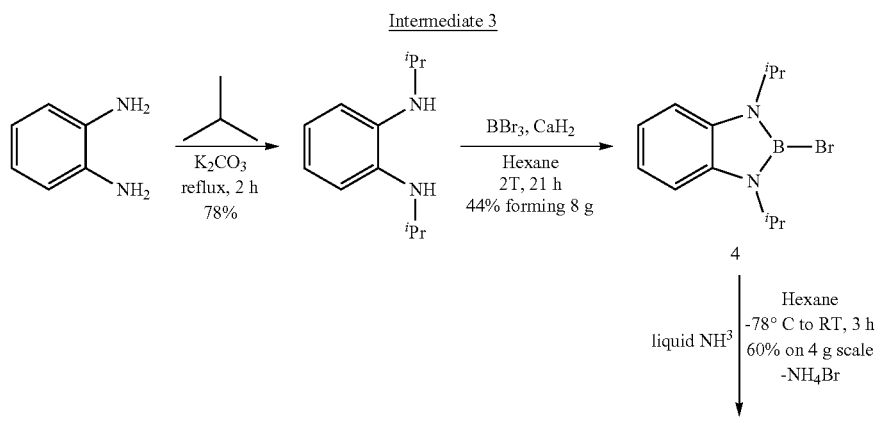

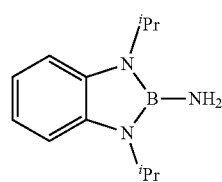

According to a literature preparation (Weber et al., *Dalton. Trans.*, 2013, 42, 2266-2281), 1,2-phenylenediamine was reacted with 2-iodopropane, and then BBr$_3$ (in the presence of CaH$_2$) to form the bromoborane BrB(NiPr)$_2$C$_6$H$_4$ (4) in a 44% yield. Slow addition of a hexane solution of 4 to liquid ammonia at −78° C. allowed controlled access to the novel borylamine H$_2$NB(NiPr)$_2$C$_6$H$_4$ (Intermediate 3) as a colourless oil in 60% yield, without the concomitant formation of the bis(boryl) amine impurity observed with reaction with gaseous ammonia (Clough et al., *J. Am. Chem. Soc.*, 2017, 139, 11165-11183).

Intermediate 5

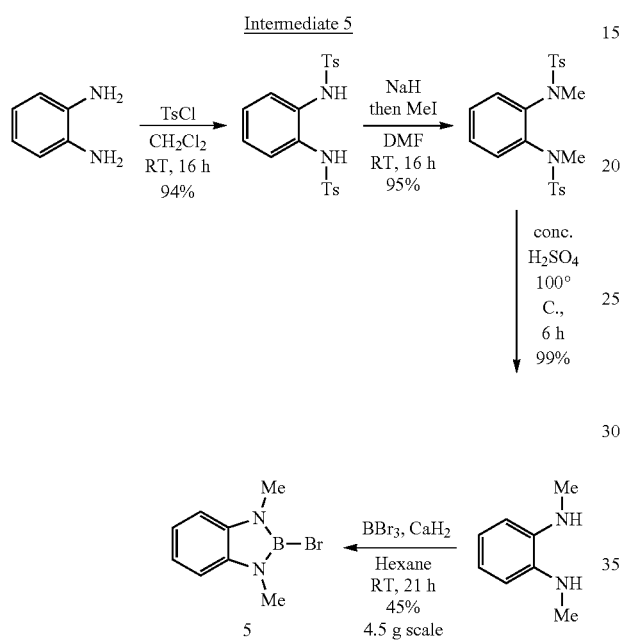

The C$_6$H$_4$ (NHMe)$_2$ precursor was prepared via tosylation, methylation and subsequent deprotection with concentrated sulfuric acid according to literature methods (N. Proust, J. C. Gallucci and L. A. Paquette, *J. Org. Chem.*, 2009, 74, 2897-2900; T. Vlaar, R. C. Cioc, P. Mampuys, B. U. W. Maes, R. V. A. Orru and E. Ruijter, *Angew. Chem. Int. Ed.*, 2012, 51, 13058-13061).

To a mixture of BBr$_3$ (6.40 mL, 56.4 mmol) and CaH$_2$ (7.91 g, 188 mmol) in hexane (120 mL) was added a solution of 1,2-C$_6$H$_4$ (NHMe)$_2$ (6.40 g, 47.0 mmol) in hexane (120 mL) dropwise, at 0° C. The mixture was allowed to warm to RT, and then stirred for 16 h. After this time, the mixture was filtered, then the remaining white solid was extracted with Et$_2$O (3×60 mL). The Et$_2$O was removed from the extracts under reduced pressure, and the product dried in vacuo to leave Intermediate 5 as a brown, waxy solid. Yield: 4.30 g (41%). $^1$H NMR (C$_6$D$_6$, 400.1 MHZ): δ 7.05 (2 H, m, 3,4-C$_6$H$_4$), 6.75 (2 H, m, 2,5-C$_6$H$_4$), 2.88 (6 H, s, NMe) ppm. $^{13}$C{$^1$H} NMR (C$_6$D$_6$, 100.6 MHZ): δ 137.8 (1,6-C$_6$H$_4$), 119.9 (3,4-C$_6$H$_4$), 108.9 (2,5-C$_6$H$_4$), 29.2 (NMe) ppm. $^{11}$B{$^1$H} NMR (C$_6$D$_6$, 128.4 MHZ): δ 23.9 ppm. IR (NaCl plates, Nujol mull, cm$^{-1}$): 2114 (w), 1907 (w), 1862 (w), 1816 (w), 1745 (w), 1608 (s), 1290 (s), 1233 (s), 1124 (s), 1071 (s), 909 (m), 807 (m), 734 (s), 615 (m), 552 (m). Anal. found (calcd. for C$_8$H$_{10}$BBrN$_2$): C, 42.58 (42.73); H, 4.34 (4.48); N, 12.54 (12.46) %.

Intermediate 6

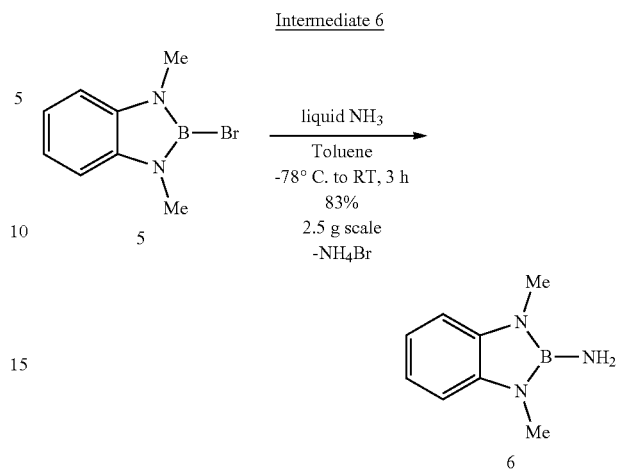

A toluene solution (120 mL) of BrB(NMe)$_2$C$_6$H$_4$ (Intermediate 5, 4.30 g, 19.1 mmol) was added in 1 mL portions to liquid NH$_3$ (30 mL) at −78° C., then the mixture allowed to warm to RT over 4 h, during which time the excess NH$_3$ boiled off was released through an oil bubbler with N$_2$ flow. The mixture was warmed to 50° C., upon which further NH$_3$ boil-off was observed. The mixture was then filtered and the volatiles removed from the filtrate under reduced pressure, to leave Intermediate 6 as a white powder, which was then dried in vacuo. Yield: 2.55 g (83%). $^1$H NMR (C$_6$D$_6$, 400.1 MHZ): δ 7.09 (2 H, m, 3,4-C$_6$H$_4$), 6.75 (2 H, m, 2,5-C$_6$H$_4$), 2.64 (6 H, s, NMe), 1.50 (2 H, br. s, NH$_2$) ppm. $^{13}$C{$^1$H} NMR (C$_6$D$_6$, 100.6 MHZ): δ 130.5 (1,6-C$_6$H$_4$), 118.3 (3,4-C$_6$H$_4$), 106.5 (2,5-C$_6$H$_4$), 29.2 (NMe) ppm. $^{11}$B{$^1$H} NMR (C$_6$D$_6$, 128.4 MHZ): δ 24.7 ppm. IR (NaCl plates, Nujol mull, cm$^{-1}$): 3454 (s), 3362 (s), 3196 (w), 2093 (w), 1883 (w), 1831 (w), 1716 (w), 1683 (w), 1606 (s), 1565 (m), 1502 (s), 1309 (s), 1235 (m), 1130 (m), 1049 (m), 891 (m), 860 (m), 735 (s), 636 (m). Anal. found (calcd. for C$_8$H$_{12}$BN$_3$): C, 59.57 (59.68); H, 7.39 (7.51); N, 25.87 (26.10) %.

Precursor 7

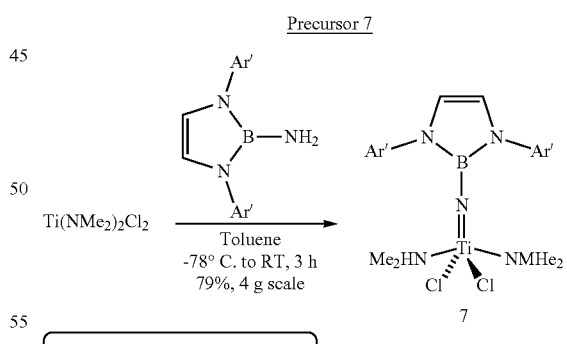

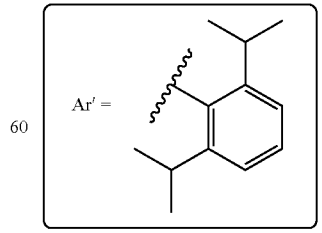

To a solution of Ti(NMe$_2$)$_2$Cl$_2$ (1.36 g, 6.58 mmol) in toluene (10 mL) was slowly added a solution of H$_2$NB (NAr'CH)$_2$ (Intermediate 1, 2.52 g, 6.25 mmol) in toluene (10 mL), at −78° C. The mixture was allowed to warm to RT, upon which it became a red/brown slurry. After stirring for 30 mins, all solids had dissolved, leaving a deep red solution, which was stirred at RT for a further 2.5 h. The volatiles were then removed under reduced pressure to leave a red-brown, waxy solid. The product was triturated in hexane, yielding Intermediate 7 as an orange-brown powder. Yield: 3.01 g (79%). Diffraction-quality crystals were grown from a saturated hexane solution at room temperature. $^1$H NMR (C$_6$D$_6$, 400.1 MHZ): δ 7.13 (6 H, overlapping 2×m, m- and p-C$_6$H$_3$Pr$_2$), 5.73 (2 H, s, NCH), 3.53 (4 H, sept., $^3$J=6.9 Hz, CHMeMe), 2.67 (2 H, sept., $^3$J=6.1 Hz, NHMe2), 1.92 (12 H, d, $^3$J=6.1 Hz, NHMe$_2$), 1.56 (12 H, d, $^3$J=6.9 Hz, CHMeMe), 1.24 (12 H, d, 3J=6.9 Hz, CHMeMe) ppm. $^{13}$C{$^1$H} NMR (C$_6$D$_6$, 100.6 MHZ): δ 146.8 (i-C$_6$H$_3$Pr$_2$), 140.2 (o-C$_6$H$_3$$^i$Pr$_2$), 127.2 (p-C$_6$H$_3$Pr$_2$), 123.3 (m-C$_6$H$_3$Pr$_2$), 115.5 (NCH), 40.0 (NHMe$_2$), 28.4 (CHMeMe), 24.2 (CHMeMe), 24.0 (CHMeMe) ppm. $^{11}$B{$^1$H} NMR (C$_6$D$_6$, 128.4 MHZ): δ 14.2 ppm. IR (NaCl plates, Nujol mull, cm$^{-1}$): 3289 (w, non-bridging N—H), 3277 (w, hydrogen bonded N—H), 1586 (m), 1260 (w), 1180 (w), 1076 (w), 1025 (m), 983 (m), 890 (m), 798 (m), 686 (w), 652 (m). IR (NaCl cell, CH$_2$Cl$_2$, ν (N—H), cm$^{-1}$): 3288. Anal. found (calcd. for C$_{30}$H$_{50}$BCl$_2$N$_5$Ti): C, 58.95 (59.04); H, 8.18 (8.26); N, 11.37 (11.47) %.

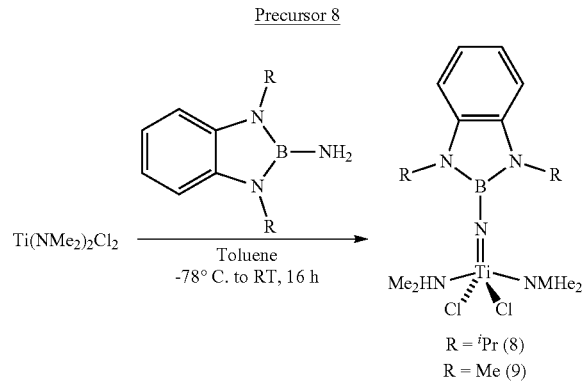

Precursor 8

R = $^i$Pr (8)
R = Me (9)

To a solution of Ti(NMe$_2$)$_2$Cl$_2$ (2.00 g, 0.01 mol) in toluene (50 mL) was added a solution of H$_2$NB(NiPr)$_2$C$_6$H$_4$ (Intermediate 3, 2.10 g, 0.01 mol) in toluene (25 mL). The reaction was left to stir for 24 hours at RT. The solvent was removed in vacuo, then the solid washed with toluene (3×10 mL) and dried in vacuo, yielding Precursor 8 as a yellow-brown solid. Yield: 3.20 g (65%). Diffraction-quality crystals were grown from a concentrated hexane solution at RT. $^1$H NMR (C$_6$D$_6$, 400.1 MHZ): δ 7.05 (4 H, m, J=2.4 Hz, 2,3,4,5-C$_6$H$_4$), 4.70 (2 H, sept., $^3$J=6.9 Hz, CHMe) 2, 2.82 (2 H, sept, $^3$J=6.2 Hz, NHMe$_2$, 2.29 (12 H, d, $^3$J=6.1 Hz, NHMe$_2$, 1.62 (12 H, d, $^3$J=6.8 Hz, CHMe$_2$). $^{13}$C{$^1$H} NMR (C$_6$D$_6$, 100.6 MHZ): 134.5 (1,6-C$_6$H$_4$), 118.2 (2,5-C$_6$H$_4$), 109.9 (3,4-C$_6$H$_4$), 44.5 (CHMe)$_2$), 40.6 (NHMe$_2$), 22.7 (CHMe$_2$). $^{11}$B{$^1$H} NMR (C$_6$D$_6$, 128.4 MHZ): δ 14.4 ppm. IR (NaCl plates, Nujol mull, cm$^{-1}$): 3257 (m, N—H), 2851 (m), 2726 (w), 2360 (w), 1594 (m), 1463.34 (s), 1376 (s), 1338 (m), 1290 (m), 1261 (w), 1133 (w), 1017 (m), 993 (m), 892 (s), 801 (m), 747 (m), 722 (m), 659 (w). Anal. found (calcd. for C$_{16}$H$_{32}$BCl$_2$N$_5$Ti): C, 45.16 (45.32); H, 7.48 (7.61); N, 16.37 (16.52) %.

Precursor 9

To a mixture of Ti(NMe$_2$)$_2$Cl$_2$ (1.61 g, 7.76 mmol) and H$_2$NB(NMe)$_2$C$_6$H$_4$ (Intermediate 6, 1.25 g, 7.76 mmol) in a Schlenk tube was added toluene (30 mL) at −78° C. The mixture was allowed to warm to RT and stirred for 1 h. After this time, the volatiles were removed under reduced pressure, then the yellow solid washed with hexane (3×15 mL) and dried in vacuo, to yield Precursor 9 as a bright yellow powder. Yield: 2.17 g (76%). $^1$H NMR (CD$_2$Cl$_2$, 400.1 MHZ): δ 6.85 (2 H, m, 3,4-C$_6$H$_4$), 6.77 (2 H, m, 2,5-C$_6$H$_4$), 3.61 (2 H, br. m, NHMe$_2$), 3.32 (6 H, s, B(NMe)$_2$), 2.79 (12 H, d, $^3$J=6.2 Hz, NHMe$_2$) ppm. $^{13}$C{$^1$H} NMR (CD$_2$Cl$_2$, 100.6 MHZ): δ 136.8 (1,6-C$_6$H$_4$), 118.9 (3,4-C$_6$H$_4$), 107.9 (2,5-C$_6$H$_4$), 41.8 (NHMe$_2$), 28.9 (B(NMe)$_2$) ppm. $^{11}$B{$^1$H} NMR (CD$_2$Cl$_2$, 128.4 MHZ): δ 14.5 ppm. IR (NaCl plates, Nujol mull, cm$^{-1}$): 3245 (s, non-bridging N—H), 3238 (s, hydrogen-bonded N—H), 1601 (m), 1504 (w), 1434 (s), 1419 (s), 1314 (s), 1231 (w), 1211 (w), 1132 (m), 1121 (m), 1059 (w), 1003 (m), 897 (s), 788 (w), 744 (s), 645 (m). Anal. found (calcd. for C$_{12}$H$_{24}$BCl$_2$N$_5$Ti): C, 39.25 (39.17); H, 6.36 (6.58); N, 18.79 (19.03) %.

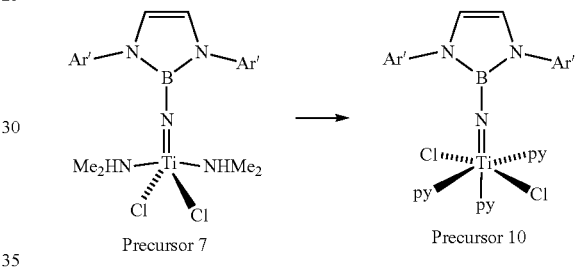

Precursor 10

To a Schlenk flask containing Ti{NB(NAr'CH)$_2$} Cl$_2$ (NHMe$_2$)$_2$ (Precursor 7, 3.0 g, 4.92 mmol) was added pyridine (5 mL). The brown solution was stirred at RT for 10 mins, and then the volatiles removed under reduced pressure to give a yellow-brown waxy solid, which was triturated in hexane (10 mL) to yield Precursor 10 as a bright yellow powder. Yield: 3.30 g (89%). Diffraction-quality crystals were grown from a saturated hexane solution at 5° C. $^1$H NMR (C$_6$D$_6$, 400.1 MHZ): δ 8.72 (4 H, d, $^3$J=4.9 Hz, 2,6-py cis to NB(NAr'CH)$_2$), 8.63 (2 H, br. m, 2,6-py trans to NB(NAr'CH)$_2$), 7.13-7.06 (6 H, overlapping 2×m, m- and p-C$_6$H$_3$Pr$_2$), 6.89 (1 H, br. m, 4-py trans to NB(NAr'CH)$_2$), 6.77 (2 H, t, $^3$J=7.6 Hz, 4-py cis to NB(NAr'CH)$_2$), 6.57 (2 H, br. m, 3,5-py trans to NB(NAr'CH)$_2$), 6.40 (4 H, m, 3,5-py cis to NB(NAr'CH)$_2$), 5.70 (2 H, s, NCH), 3.63 (4 H, sept., $^3$J=6.9 Hz, CHMeMe), 1.50 (12 H, d, $^3$J=6.9 Hz, CHMeMe), 1.26 (12 H, d, $^3$J=6.9 Hz, CHMeMe) ppm. $^{13}$C{$^1$H} NMR (C$_6$D$_6$, 100.6 MHZ): δ 151.6 (2,6-py cis to NB(NAr'CH)$_2$), 150.8 (2,6-py trans to NB(NAr'CH)$_2$), 147.3 (o-C$_6$H$_3$Pr$_2$), 140.9 (i-C$_6$H$_3$$^i$Pr$_2$), 137.3 (4-py cis to NB(NAr'CH)$_2$), 135.7 (4-py trans to NB(NAr'CH)$_2$), 127.4 (p-C$_6$H$_3$$^i$Pr$_2$), 123.7 (3,5-py cis to NB(NAr'CH)$_2$), 123.6 (m-C$_6$H$_3$$^i$Pr$_2$), 123.4 (3,5-py trans to NB(NAr'CH)$_2$), 116.2 (NCH), 28.8 (CHMeMe), 24.5 (CHMeMe), 24.3 (CHMeMe) ppm. $^{11}$B{$^1$H} NMR (C$_6$D$_6$, 128.4 MHZ): δ 13.8 ppm. IR (NaCl plates, Nujol mull, cm$^{-1}$): 3072 (w), 1606 (s), 1219 (s), 1117 (m), 1102 (m), 1073 (m), 1043 (m), 1015 (m), 896 (s), 802 (m), 710 (w), 698 (w), 686 (m), 667 (w), 646 (m), 638 (w), 616 (w). Anal. found (calcd. for C$_{41}$H$_{51}$BCl$_2$N$_6$Ti): C, 64.84 (65.01); H, 6.86 (6.79); N, 10.94 (11.09) %.

Synthesis of Example Borylimide Catalysts

Example 1

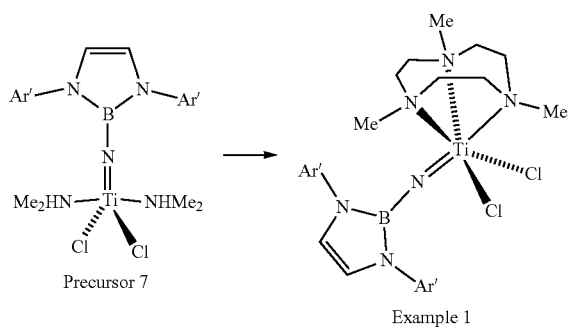

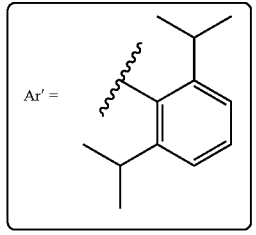

Precursor 7

Example 1

To a solution of Ti{NB(NAr'CH)$_2$} Cl$_2$ (NHMe$_2$)$_2$ (Precursor 7, 0.50 g, 0.819 mmol) in toluene (15 mL) was added Me$_3$[9]aneN$_3$ (159 μL, 0.819 mmol) via microsyringe at RT. The mixture was heated to 45° C. and then stirred for 16 h, after which time it had become an orange solution. The volatiles were removed under reduced pressure, and the yellow solid washed with hexane (2×8 mL), then dried in vacuo, leaving Example 1 as a pale yellow powder. Yield: 0.427 g (75%). $^1$H NMR (C$_6$D$_6$, 400.1 MHZ): δ 7.29 (6 H, overlapping 2×m, m- and p-C$_6$H$_3$Pr$_2$), 5.89 (2 H, s, NCH), 3.69 (4 H, sept., $^3$J=6.9 Hz, CHMeMe), 2.74 (2 H, m, NCH2), 2.59 (6 H, s, NMe cis to NB(NAr'CH)$_2$), 2.38 (2 H, m, NCH2), 2.28 (3 H, s, NMe trans to NB(NAr'CH)$_2$), 2.24 (2 H, m, NCH2), 1.74 (2 H, m, NCH2), 1.61 (12 H, d, $^3$J=6.9 Hz, CHMeMe), 1.52 (2 H, m, NCH2), 1.38 (2 H, m, NCH2), 1.31 (12 H, d, $^3$J=6.9 Hz, CHMeMe) ppm. $^{13}$C{$^1$H} NMR (C$_6$D$_6$, 100.6 MHZ): δ 147.1 (o-C$_6$H$_3$$^i$Pr$_2$), 141.3 (i-C$_6$H$_3$Pr$_2$), 127.1 (p-C$_6$H$_3$Pr$_2$), 123.4 (m-C$_6$H$_3$Pr$_2$), 117.0 (NCH), 56.7 (NCH$_2$), 56.6 (NCH$_2$), 54.0 (NCH$_2$), 53.7 (NMe cis to NB(NAr'CH)$_2$), 48.9 (NMe trans to NB(NAr'CH)$_2$), 29.0 (CHMeMe), 26.4 (CHMeMe), 23.5 (CHMeMe) ppm. $^{11}$B{$^1$H} NMR (C$_6$D$_6$, 128.4 MHZ): δ 14.0 ppm. IR (NaCl plates, Nujol mull, cm$^{-1}$): 2359 (w), 2343 (w), 1701 (w), 1586 (w), 1497 (m), 1422 (m), 1399 (s), 1325 (s), 1274 (m), 1226 (w), 1206 (w), 1178 (w), 1115 (m), 1069 (s), 1005 (s), 994 (m), 937 (m), 892 (s), 804 (m), 762 (s), 751 (m), 698 (w), 670 (m), 660 (s), 621 (w), 584 (m). EI-MS: m/z=690 [M]+ (14%). Anal. found (calcd. for C$_{35}$H$_{57}$BCl$_2$N$_6$Ti): C, 60.62 (60.80); H, 8.46 (8.31); N, 12.04 (12.15) %.

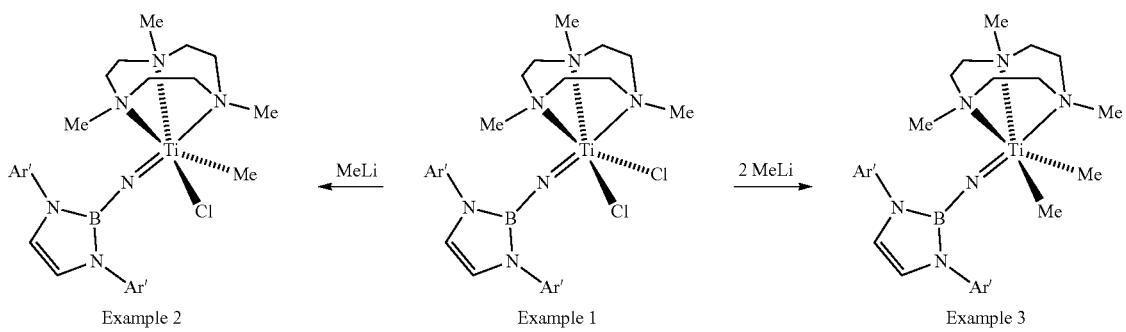

Example 2     Example 1     Example 3

Example 2

To a solution of Ti{NB(NAr'CH)$_2$} Cl$_2$ (Me$_3$[9] aneN$_3$) (Example 1, 0.20 g, 0.289 mmol) in toluene (10 mL) was added MeLi (1.6 M in hexane, 398 μL, 0.636 mmol) at −78° C. The mixture was allowed to warm to RT then stirred for 2 h, after which time it had become a yellow suspension. The volatiles were removed under reduced pressure, and the yellow solid extracted with benzene (3×5 mL). The solvent was removed from the extracts under reduced pressure, the product washed with hexane (3×5 mL), then dried in vacuo, leaving Example 2 as a yellow powder. Yield: 0.125 g (64%). $^1$H NMR (C$_6$D$_6$, 400.1 MHZ): δ 7.28 (6 H, overlapping 2×m, m- and p-C$_6$H$_3$Pr$_2$), 5.98 (2 H, s, NCH), 3.91 (2 H, sept., $^3$J=6.9 Hz, CHaMeMe), 3.72 (2 H, sept., $^3$J=6.9 Hz, CH.MeMe), 2.69 (3 H, s, NMe), 2.57 (2 H, m, NCH$_2$), 2.45 (1 H, m, NCH$_2$), 2.28 (3 H s, NMe), 2.16 (1 H, m, NCH$_2$), 2.15 (3 H, s, NMe), 2.03 (1 H, m, NCH$_2$), 1.87 (1 H, m, NCH$_2$), 1.72 (1 H, m, NCH$_2$), 1.59 (12 H, app. t, app. $^3$J=7.9 Hz, overlapping CHMeaMe and CHMe Me), 1.45 (5 H, overlapping m, NCH$_2$), 1.35 (12 H, app. d, app. $^3$J=6.2 Hz, overlapping CHMeaMe and CHMebMe), -0.19 (TiMe) ppm. $^{13}$C{$^1$H} NMR (C$_6$D$_6$, 100.6 MHZ): δ 147.4 (0-C$_6$H$_3^i$Pr$_2$), 142.3 (i-C$_6$H$_3$Pr$_2$), 126.8 (p-C$_6$H$_3$Pr$_2$), 123.2 (m-C$_6$H$_3$Pr$_2$), 116.8 (NCH), 56.8 (NCH$_2$), 56.4 (NCH$_2$), 55.5 (NCH$_2$), 55.4 (NCH$_2$), 55.0 (NCH$_2$), 53.7 (NCH$_2$), 53.6 (NMe), 51.9 (NMe), 48.9 (NMe), 37.6 (TiMe), 29.1 (CaHMeMe), 28.8 (CbHMeMe), 26.4 (CHMe$_2$), 26.3 (CHMe$_2$), 23.8 (CHMe$_2$), 23.3 (CHMe$_2$) ppm. $^{11}$B{$^1$H} NMR (C$_6$D$_6$, 128.4 MHZ): Ô 14.0 ppm. Anal. found (calcd. for C$_{36}$H$_{60}$BClN$_6$Ti): C, 64.00 (64.44); H, 8.88 (9.01); N, 12.39 (12.52) %.

Example 3

To a solution of Ti{NB(NAr'CH)$_2$} Cl$_2$ (Me$_3$[9] aneN$_3$) (Example 1, 0.50 g, 0.723 mmol) in toluene (20 mL) was added MeLi (1.6 M in hexane, 0.995 mL, 1.59 mmol) at −78° C. The mixture was allowed to warm to RT then heated to 60° C. and stirred for 20 h, after which time it had become a yellow suspension. The volatiles were removed under reduced pressure, and the yellow solid extracted with benzene (2×10 mL). The solvent was removed from the extracts under reduced pressure, then dried in vacuo, leaving Example 3 as a yellow powder. Yield: 0.325 g (69%). $^1$H NMR (C$_6$D$_6$, 400.1 MHZ): δ 7.29 (6 H, overlapping 2×m, m- and p-C$_6$H$_3$Pr$_2$), 6.05 (2 H, s, NCH), 3.97 (4 H, sept., $^3$J=6.9 Hz, CHMeMe), 2.42 (2 H, m, NCH$_2$), 2.26 (6 H, s, NMe cis to NB(NAr'CH)$_2$), 2.23 (3 H, s, NMe trans to NB(NAr'CH)$_2$), 2.14 (2 H, m, NCH$_2$), 1.97 (2 H, m, NCH$_2$), 1.56 (18 H, overlapping d and m, CHMeMe and NCH$_2$), 1.40 (12 H, d, $^3$J=6.9 Hz, CHMeMe), -0.03 (6 H, s, TiMe) ppm. $^{13}$C{$^1$H} NMR (C$_6$D$_6$, 100.6 MHZ): δ 147.1 (o-C$_6$H$_3$Pr$_2$), 142.8 (i-C$_6$H$_3$Pr$_2$), 126.0 (p-C$_6$H$_3$Pr$_2$), 122.8 (m-C$_6$H$_3$Pr$_2$), 116.4 (NCH), 55.3 (NCH$_2$), 54.7 (NCH$_2$), 51.4 (NMe cis to NB(NAr'CH)$_2$), 48.4 (NMe trans to NB(NAr'CH)$_2$), 32.4 (TiMe), 28.5 (CHMeMe), 25.8 (CHMeMe), 23.1 (CHMeMe) ppm. $^{11}$B{$^1$H} NMR (C$_6$D$_6$, 128.4 MHz): δ 14.0 ppm.

Example 4

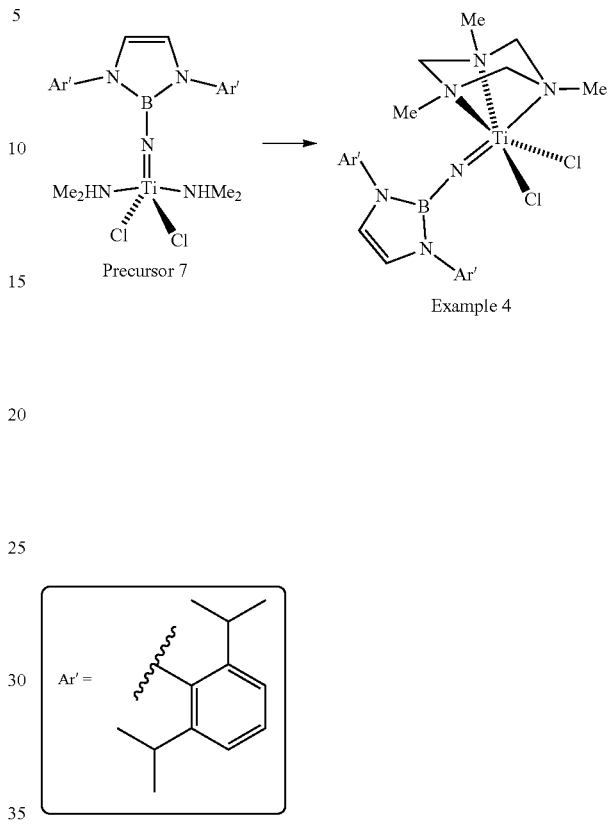

Example 4

To a solution of Ti{NB(NAr'CH)$_2$} Cl$_2$ (NHMe$_2$)$_2$ (Precursor 7, 0.25 g, 0.410 mmol) in toluene (10 mL) at −78° C. was added Me$_3$[6] aneN$_3$ (57.5 μL, 0.409 mmol). The solution was then allowed to warm to RT, and stirred for 3 h, after which time it had become an orange slurry. The slurry was concentrated (by ~75%) and filtered, then the resulting solid washed with hexane (3×2 mL) and dried in vacuo, yielding Example 4 as a pale orange powder. Yield: 0.154 g (58%). $^1$H NMR (C$_6$D$_6$, 400.1 MHZ): δ 7.27 (6 H, overlapping 2×m, m- and p-C$_6$H$_3$Pr$_2$), 5.83 (2 H, s, NCH), 4.00 (1 H, d, 2J=7.3 Hz, NCH$_2$), 3.56 (4 H, sept., $^3$J=6.9 Hz, CHMeMe), 3.33 (2 H, d, 2J=7.9 Hz, NCH$_2$), 2.24 (1 H, d, 2J=7.3 Hz, NCH$_2$), 1.95 (2 H, d, 2J=7.9 Hz, NCH$_2$), 1.87 (6 H, s, NMe cis to NB(NAr'CH)$_2$), 1.66 (12 H, d, $^3$J=6.9 Hz, CHMeMe), 1.48 (3 H, s, NMe trans to NB(NAr'CH)$_2$), 1.31 (12 H, d, $^3$J=6.9 Hz, CHMeMe) ppm. $^{13}$C{$^1$H} NMR (C$_6$D$_6$, 100.6 MHZ): δ 147.3 (o-C$_6$H$_3$Pr$_2$), 141.0 (i-C$_6$H$_3$Pr$_2$), 127.4 (p-C$_6$H$_3$Pr$_2$), 123.7 (m-C$_6$H$_3$Pr$_2$), 116.5 (NCH), 77.0 (NCH$_2$), 76.0 (NCH$_2$), 40.6 (NMe cis to NB(NAr'CH)$_2$), 36.8 (NMe trans to NB(NAr'CH)$_2$), 29.3 (CHMeMe), 25.5 (CHMeMe), 24.6 (CHMeMe) ppm. $^{11}$B{$^1$H} NMR (C$_6$D$_6$, 128.4 MHZ): δ 13.4 ppm. IR (NaCl plates, Nujol mull, cm$^{-1}$): 1595 (m), 1459 (s), 1380 (s), 1273 (m), 1260 (m), 1175 (w), 1113 (w), 1083 (m), 935 (w), 899 (w), 799 (m), 758 (w), 721 (w), 657 (w). Anal. found (calcd. for C$_{32}$H$_{51}$BCl$_2$N$_6$Ti): C, 56.28 (59.19); H, 7.46 (7.92); N, 12.75 (12.94) %. Repeated attempts to obtain an elemental analysis with satisfactory % C values failed, presumably due to incomplete combustion of the compound.

Example 5

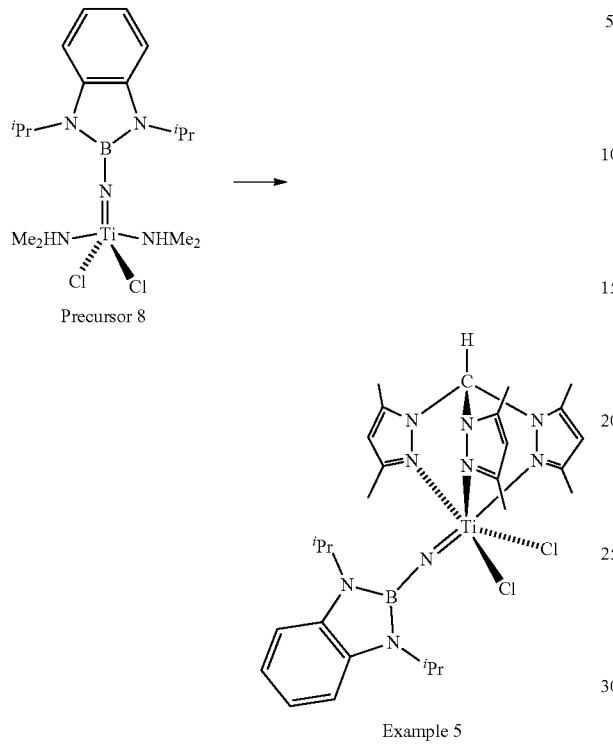

Precursor 8

Example 5

To a mixture of Ti{NB(NiPr)$_2$C$_6$H$_4$} Cl$_2$ (NHMe$_2$)$_2$ (Precursor 8, 0.50 g, 1.18 mmol) and HC (Me$_2$pz)$_3$ (0.352 g, 1.18 mmol) in a Schlenk tube was added toluene (15 mL). The mixture was heated to 75° C. and stirred for 16 h. After this time, the volatiles were removed under reduced pressure, then the yellow solid washed with benzene (4×5 mL) and dried in vacuo, to yield Example 5 as a yellow powder. Yield: 0.478 g (64%).

Diffraction-quality crystals were grown from a CH$_2$Cl$_2$ solution layered with hexane. $^1$H NMR (CD$_2$Cl$_2$, 400.1 MHZ, 183 K): δ 7.77 (1 H, s, HC (Me$_2$pz)$_3$), 6.77 (2 H, overlapping 2× m, 3,4-C$_6$H$_4$), 6.70 (1 H, m, 2- or 5-C$_6$H$_4$), 6.61 (1 H, m, 2- or 5-C$_6$H$_4$), 6.14 (2 H, s, 4-N$_2$C$_3$Me$_2$H cis to NB(NiPr)$_2$C$_6$H$_4$), 5.89 (1 H, s, 4-N$_2$C$_3$Me$_2$H trans to NB(NiPr)$_2$C$_6$H$_4$), 4.01 (1 H, br. m, CHaMe$_2$), 3.28 (1 H, br. m, CHbMe$_2$), 2.68 (6 H, s, N$_2$C$_3$Me$_2$H cis to NB(NiPr)$_2$ C$_6$H$_4$), 2.57 (6 H, s, N$_2$C$_3$Me$_2$H cis to NB(NiPr)$_2$C$_6$H$_4$), 2.45 (3 H, s, N$_2$C$_3$Me$_2$H trans to NB(NPr)$_2$C$_6$H$_4$), 2.42 (3 H, s, N$_2$C$_3$Me$_2$H trans to NB(NiPr)$_2$C$_6$H$_4$), 1.75 (6 H, br. m, CHMe$_{2a}$), 0.92 (6 H, br. d, $^3$J=6.5 Hz, CHMe$_{2b}$) ppm. $^{13}$C{$^1$H} NMR (CD$_2$Cl$_2$, 100.6 MHz, 183 K): δ 155.9 (3-pz cis to NB(NiPr)$_2$C$_6$H$_4$), 154.7 (3-pz trans to NB(NiPr)$_2$ C$_6$H$_4$), 139.7 (5-pz cis to NB(NiPr)$_2$C$_6$H$_4$), 138.8 (5-pz trans to NB(NiPr)$_2$C$_6$H$_4$), 138.2 (1,6-C$_6$H$_4$), 118.0 (2,5-C$_6$H$_4$), 116.6 (2,5-C$_6$H$_4$), 111.8 (3,4-C$_6$H$_4$), 108.3 (4-pz trans to NB(NiPr)$_2$C$_6$H$_4$), 108.2 (4-pz cis to NB(NiPr)$_2$C$_6$H$_4$), 67.2 (HC (Me$_2$PZ)$_3$), 44.4 (CaHMe$_2$), 44.0 (CbHMe$_2$), 23.9 (CHMe$_{2a}$), 20.7 (CHMe$_{2b}$), 16.5 (N$_2$C$_3$Me$_2$H cis to NB(NiPr)$_2$C$_6$H$_4$), 14.6 (N$_2$C$_3$Me$_2$H trans to NB(NiPr)$_2$ C$_6$H$_4$), 11.7 (N$_2$C$_3$Me$_2$H cis to NB(NiPr)$_2$C$_6$H$_4$), 11.2 (N$_2$C$_3$Me$_2$H trans to NB(NiPr)$_2$C$_6$H$_4$) ppm. $^{11}$B{$^1$H} NMR (CD$_2$Cl$_2$, 128.4 MHZ): δ 14.2 ppm.

IR (NaCl plates, Nujol mull, cm$^{-1}$): 1595 (m), 1566 (s), 1414 (s), 1390 (s), 1336 (s), 1226 (m), 1179 (m), 1139 (m), 1111 (w), 1043 (s), 992 (m), 978 (m), 647 (w), 913 (s), 899 (w), 863 (w), 767 (w), 734 (s), 704 (s), 687 (m), 669 (w), 663 (w), 632 (w), 555 (w). Anal. found (calcd. for C$_{28}$H$_{40}$BCl$_2$N$_9$Ti): C, 52.99 (53.19); H, 6.33 (6.38); N, 19.82 (19.94) %.

Example 6

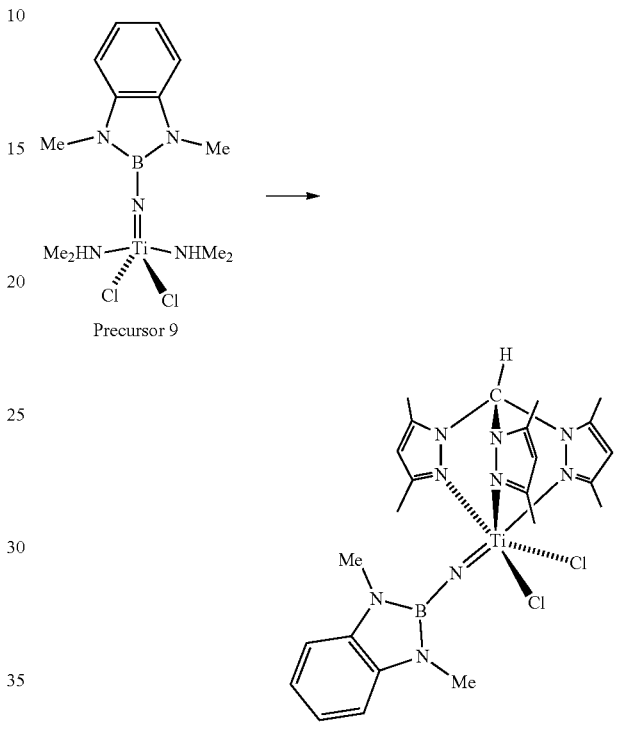

Precursor 9

Example 6

To a mixture of Ti{NB(NMe)$_2$C$_6$H$_4$} Cl$_2$ (NHMe$_2$)$_2$ (Precursor 9, 0.50 g, 1.36 mmol) and HC (Me$_2$pz)$_3$ (0.405 g, 1.36 mmol) in a Schlenk tube was added toluene (15 mL). The mixture was heated to 70° C. and stirred for 16 h. After this time, the volatiles were removed under reduced pressure, then the yellow-brown solid washed with benzene (2×10 mL) and dried in vacuo, to yield Example 6 as a yellow powder. Yield: 0.450 g (57%). Diffraction-quality crystals were grown from a CH$_2$Cl$_2$ solution layered with benzene. $^1$H NMR (CD$_2$Cl$_2$, 400.1 MHZ): δ 7.84 (1 H, s, HC (Me$_2$pz)$_3$), 6.81 (2 H, m, 3,4-C$_6$H$_4$), 6.68 (2 H, m, 2,5-C$_6$H$_4$), 6.61 (1 H, m, 2,5-C$_6$H$_4$), 6.11 (2 H, s, 4-N$_2$C$_3$Me$_2$H cis to NB(N$^i$Pr)$_2$C$_6$H$_4$), 5.91 (1 H, s, 4-N$_2$C$_3$Me$_2$H trans to NB(NiPr)$_2$C$_6$H$_4$), 3.11 (6 H, s, B(NMe)$_2$), 2.73 (6 H, s, N$_2$C$_3$Me$_2$H cis to NB(NiPr)$_2$C$_6$H$_4$), 2.58 (6 H, s, N$_2$C$_3$Me$_2$H cis to NB(NiPr)$_2$C$_6$H$_4$), 2.56 (3 H, s, N$_2$C$_3$Me$_2$H trans to NB(NiPr)$_2$C$_6$H$_4$), 2.45 (3 H, s, N$_2$C$_3$Me$_2$H trans to NB(NiPr)$_2$C$_6$H$_4$) ppm. $^{13}$C{$^1$H} NMR (CD$_2$Cl$_2$, 100.6 MHZ): δ 156.7 (3-pz cis to NB(NiPr)$_2$C$_6$H$_4$), 151.6 (3-pz trans to NB(NiPr)$_2$C$_6$H$_4$), 140.0 (5-pz cis to NB(NiPr)$_2$ C$_6$H$_4$), 137.5 (overlapping 5-pz trans to NB(NiPr)$_2$C$_6$H$_4$ and 1,6-C$_6$H$_4$), 118.4 (3,4-C$_6$H$_4$), 109.0 (4-pz trans to NB(N$^i$Pr)$_2$ C$_6$H$_4$), 108.7 (4-pz cis to NB(N$^i$Pr)$_2$C$_6$H$_4$), 107.3 (2,5-C$_6$H$_4$), 68.1 (HC (Me$_2$pz)$_3$), 28.9 (B(NMe)$_2$), 16.2 (N$_2$C$_3$Me$_2$H cis to NB(NiPr)$_2$C$_6$H$_4$), 14.9 (N$_2$C$_3$Me$_2$H trans to NB(NiPr)$_2$C$_6$H$_4$), 11.6 (N$_2$C$_3$Me$_2$H cis to NB(NiPr)$_2$ C$_6$H$_4$), 11.2 (N$_2$C$_3$Me$_2$H trans to NB(NiPr)$_2$C$_6$H$_4$) ppm. $^{11}$B{$^1$H} NMR (CD$_2$Cl$_2$, 128.4 MHZ): δ 14.0 ppm.

Example 7

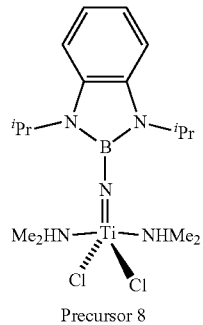

Precursor 8

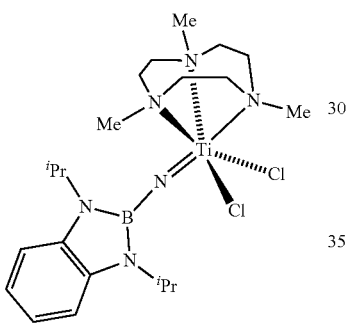

Example 7

To a suspension of Ti{NB(NiPr)$_2$C$_6$H$_4$} Cl$_2$ (NHMe$_2$)$_2$ (Precursor 8, 0.50 g, 1.18 mmol) in benzene (15 mL) was added Me$_3$[9] aneN$_3$ (228 µL, 1.18 mmol) via microsyringe. The mixture was stirred for 90 minutes at RT, then filtered. The orange solid was washed with benzene (10 mL), then dried in vacuo, to yield Example 7 as an orange powder. Yield: 0.401 g (67%). Diffraction-quality crystals were grown from a CH$_2$Cl$_2$ solution layered with hexane. $^1$H NMR (CD$_2$Cl$_2$, 400.1 MHZ): δ 6.99 (2 H, m, 3,4-C$_6$H$_4$), 6.71 (2 H, m, 2,5-C$_6$H$_4$), 4.98 (2 H, sept., $^3$J=7.0 Hz, CHMe$_2$), 3.69 (2 H, m, NCH$_2$), 3.33 (6 H, s, NMe cis to NB(NiPr)$_2$C$_6$H$_4$), 3.23 (2 H, m, NCH$_2$), 3.07 (2 H, m, NCH$_2$), 2.99 (2 H, m, NCH$_2$), 2.77 (2 H, m, NCH$_2$), 2.56 (5 H, overlapping s and m, NMe trans to NB(NiPr)$_2$C$_6$H$_4$, and NCH$_2$), 1.49 (12 H, d, $^3$J=7.0 Hz, CHMe$_2$) ppm. $^{13}$C{$^1$H} NMR (CD$_2$Cl$_2$, 100.6 MHZ): δ 135.2 (1,6-C$_6$H$_4$), 117.3 (2,5-C$_6$H$_4$), 111.4 (3,4-C$_6$H$_4$), 57.9 (NCH$_2$), 57.8 (NCH$_2$), 54.9 (NCH$_2$ and NMe cis to NB(NiPr)$_2$C$_6$H$_4$), 49.1 (NMe trans to NB(NiPr)$_2$C$_6$H$_4$), 45.5 (CHMe$_2$), 21.9 (CHMe$_2$) ppm. $^{11}$B{$^1$H} NMR (CD$_2$Cl$_2$, 128.4 MHZ): δ 14.5 ppm. IR (NaCl plates, Nujol mull, cm$^{-1}$): 1594 (m), 1573 (w), 1483 (s), 1421 (s), 1288 (s), 1198 (m), 1140 (s), 1067 (s), 1031 (w), 1000 (s), 984 (m), 892 (m), 864 (w), 784 (s), 738 (s), 682 (w), 663 (m), 583 (w). EI-MS: m/z=504 [M]+ (1%). Anal. found (calcd. for C$_{21}$H$_{39}$BCl$_2$N$_6$Ti): C, 49.85 (49.93); H, 7.89 (7.78); N, 16.48 (16.64) %.

Example 8

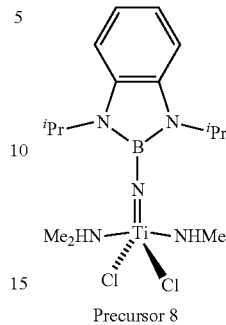

Precursor 8

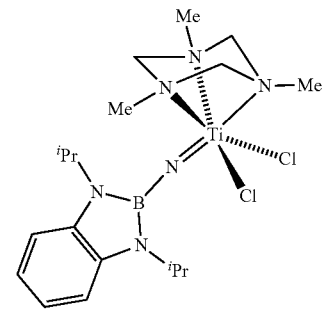

Example 8

To a suspension of Ti{NB(NiPr)$_2$C$_6$H$_4$} Cl$_2$ (NHMe$_2$)$_2$ (Precursor 8, 0.50 g, 1.18 mmol) in benzene (15 mL) was added Me$_3$[6] aneN$_3$ (166 µL, 1.18 mmol) via microsyringe. The mixture was stirred for 90 minutes at RT, then filtered. The orange solid was washed with benzene (5 mL), then dried in vacuo, to yield Example 8 as an orange powder. Yield: 0.330 g (60%). Diffraction-quality crystals were grown from a benzene solution at RT. $^1$H NMR (CD$_2$Cl$_2$, 500.3 MHZ, 253 K): δ 6.91 (2 H, m, 3,4-C$_6$H$_4$), 6.72 (2 H, m, 2,5-C$_6$H$_4$), 4.84 (1 H, d, 2J=7.9 Hz, NCH$_2$), 4.66 (2 H, sept., $^3$J=6.8 Hz, CHMe$_2$), 4.21 (2 H, d, 2J=7.8 Hz, NCH$_2$), 3.81 (1 H, d, 2J=7.9 Hz, NCH$_2$), 3.42 (2 H, d, 2J=7.8 Hz, NCH$_2$), 2.86 (6 H, s, NMe cis to NB(NiPr)$_2$C$_6$H$_4$), 2.20 (3 H, s, NMe trans to NB(N$^i$Pr)$_2$C$_6$H$_4$), 1.50 (12 H, d, $^3$J=6.8 Hz, CHMe$_2$) ppm. $^{13}$C{$^1$H} NMR (CD$_2$Cl$_2$, 125.7 MHz, 253 K): δ 134.6 (1,6-C$_6$H$_4$), 117.4 (2,5-C$_6$H$_4$), 110.1 (3,4-C$_6$H$_4$), 77.8 (NCH$_2$), 77.3 (NCH$_2$), 44.8 (CHMe$_2$), 41.8 (NMe cis to NB(NiPr)$_2$C$_6$H$_4$), 37.3 (NMe trans to NB(NiPr)$_2$ C$_6$H$_4$), 22.2 (CHMe$_2$) ppm. $^{11}$B{$^1$H} NMR (CD$_2$Cl$_2$, 160.4 MHZ, 253 K): δ 14.8 ppm. IR (NaCl plates, Nujol mull, cm$^{-1}$): 1913 (w), 1859 (w), 1805 (w), 1737 (w), 1597 (s), 1578 (m), 1409 (s), 1336 (s), 1292 (s), 1224 (m), 1138 (s), 1128 (s), 1110 (s), 1033 (w), 1010 (m), 996 (m), 939 (w), 903 (w), 866 (w), 766 (w), 743 (s), 678 (w), 667 (w), 658 (m), 621 (w), 556 (m). Anal. found (calcd. for C$_{18}$H$_{33}$BCl$_2$N$_6$Ti): C, 46.87 (46.69); H, 7.34 (7.18); N, 18.05 (18.15) %.

Example 9

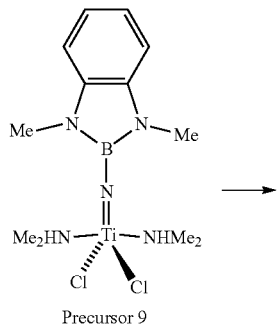

Precursor 9

→

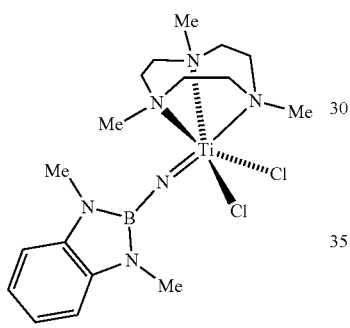

Example 9

To a suspension of Ti{NB(NMe)$_2$C$_6$H$_4$} Cl$_2$ (NHMe$_2$)$_2$ (Precursor 9, 0.50 g, 1.36 mmol) in benzene (15 mL) was added Me$_3$[9] aneN$_3$ (263 μL, 1.36 mmol) via microsyringe. The mixture was stirred for 60 minutes at RT, then filtered. The orange solid was washed with benzene (5 mL), then dried in vacuo, to yield Example 9 as an orange powder. Yield: 0.509 g (83%). Diffraction-quality crystals were grown from a CH$_2$Cl$_2$ solution layered with benzene. $^1$H NMR (CD$_2$Cl$_2$, 400.1 MHZ): δ 6.83 (2 H, m, 3,4-C$_6$H$_4$), 6.72 (2 H, m, 2,5-C$_6$H$_4$), 3.70 (2 H, m, NCH$_2$), 3.38 (6 H, s, B(NMe)$_2$), 3.35 (6 H, s, Me$_3$[9] aneN$_3$ cis to NB(NMe)$_2$C$_6$H$_4$), 3.22 (2 H, m, NCH$_2$), 3.01 (4 H, overlapping 2×m, NCH$_2$), 2.78 (2 H, m, NCH$_2$), 2.55 (5 H, overlapping s and m, Me$_3$[9] aneN$_3$ trans to NB(NMe)$_2$C$_6$H$_4$, and NCH$_2$) ppm. $^{13}$C{$^1$H} NMR (CD$_2$Cl$_2$, 100.6 MHZ): δ 137.6 (1,6-C$_6$H$_4$), Substitute Specification 118.5 (3,4-C$_6$H$_4$), 107.3 (2,5-C$_6$H$_4$), 57.9 (NCH$_2$), 57.7 (NCH$_2$), 55.0 (NCH$_2$), 54.9 (Me$_3$[9] aneN$_3$ cis to NB(NMe)$_2$C$_6$H$_4$), 49.2 (Me$_3$[9] aneN$_3$ trans to NB(NMe)$_2$C$_6$H$_4$), 29.9 (B(NMe)$_2$) ppm. $^{11}$B{$^1$H} NMR (CD$_2$Cl$_2$, 128.4 MHZ): δ 14.9 ppm. IR (NaCl plates, Nujol mull, cm$^{-1}$): 1809 (w), 1699 (w), 1602 (m), 1407 (s), 1312 (s), 1225 (m), 1202 (w), 1127 (s), 1073 (s), 1004 (s), 893 (m), 779 (s), 757 (s), 736 (m), 690 (m), 674 (m), 649 (m). Anal. found (calcd. for C$_{14}$H$_{25}$BCl$_2$N$_6$Ti): C, 45.58 (45.47); H, 7.01 (6.96); N, 18.57 (18.72) %.

Example 10

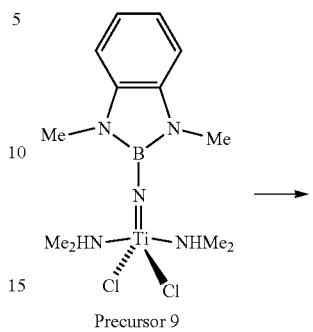

Precursor 9

→

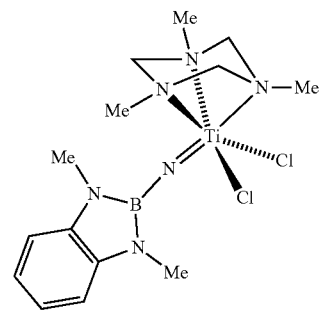

Example 10

To a suspension of Ti{NB(NMe)$_2$C$_6$H$_4$} Cl$_2$ (NHMe$_2$)$_2$ (Precursor 9, 0.500 g, 1.36 mmol) in benzene (15 mL) was added Me$_3$[6] aneN$_3$ (191 μL, 1.36 mmol) via microsyringe. The mixture was stirred for 60 minutes at RT, then filtered. The orange solid was washed with benzene (5 mL), then dried in vacuo, to yield Example 10 as an orange powder. Yield: 0.410 g (74%). Diffraction-quality crystals were grown from a CH$_2$Cl$_2$ solution layered with hexane. $^1$H NMR (CD$_2$Cl$_2$, 500.3 MHZ, 253 K): δ 6.83 (2 H, m, 3,4-C$_6$H$_4$), 6.70 (2 H, m, 2,5-C$_6$H$_4$), 4.80 (1 H, d, 2J=7.9 Hz, NCH$_2$), 4.20 (2 H, d, 2J=7.9 Hz, NCH$_2$), 3.83 (1 H, d, 2J=7.9 Hz, NCH$_2$), 3.48 (2 H, d, 2J=7.9 Hz, NCH$_2$), 3.29 (6 H, s, B(NMe)$_2$), 2.85 (6 H, s, NMe cis to NB(NMe)$_2$C$_6$H$_4$), 2.19 (3 H, s, NMe trans to NB(NMe)$_2$C$_6$H$_4$) ppm. $^{13}$C{$^1$H} NMR (CD$_2$Cl$_2$, 125.7 MHz, 253 K): d 136.7 (1,6-C$_6$H$_4$), 118.4 (3,4-C$_6$H$_4$), 107.3 (2,5-C$_6$H$_4$), 77.8 (NCH$_2$), 77.3 (NCH$_2$), 41.9 (NMe cis to NB(NMe)$_2$C$_6$H$_4$), 37.4 (NMe trans to NB(NMe)$_2$C$_6$H$_4$), 29.0 (B(NMe)$_2$) ppm. $^{11}$B{$^1$H} NMR (CD$_2$Cl$_2$, 160.4 MHz, 253 K): Õ 14.2 ppm. IR (NaCl plates, Nujol mull, cm$^{-1}$): 2460 (w), 1602 (m), 1430 (s), 1413 (s), 1395 (s), 1273 (s), 1230 (w), 1175 (m), 1119 (s), 1006 (m), 935 (m), 892 (w), 783 (m), 734 (s), 691 (w), 662 (w), 642 (s), 623 (w), 610 (w). Anal. found (calcd. for C$_{14}$H$_{25}$BCl$_2$N$_6$Ti): C, 39.07 (41.32); H, 5.94 (6.19); N, 16.27 (20.65) %.

Example 11

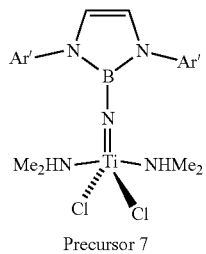

Precursor 7

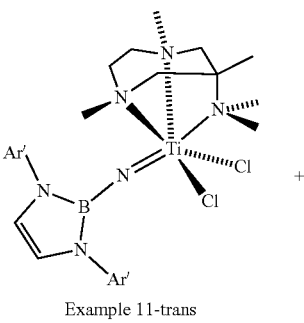

Example 11-trans

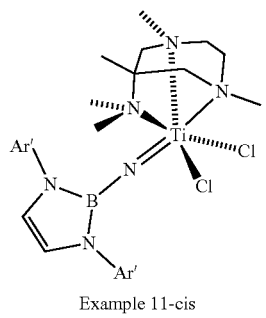

Example 11-cis

To a solution of Ti{NB(NAr'CH)$_2$} Cl$_2$ (NHMe$_2$)$_2$ (Precursor 7, 0.35 g, 0.573 mmol) in toluene (15 mL) was added Me$_4$DACH (168 µL, 0.860 mmol) via microsyringe at RT. The mixture was heated to 60° C. and then stirred for 16 h, after which time it had become an orange solution. The volatiles were removed under reduced pressure, and the orange solid washed with hexane (3×8 mL), then dried in vacuo, leaving Example 11 as a pale orange powder. Yield: 0.344 g (85%). The $^1$H NMR spectrum indicated an approximately 55:45 mixture of the cis and trans isomers. Diffraction-quality crystals were grown from a hexane solution at 4° C.

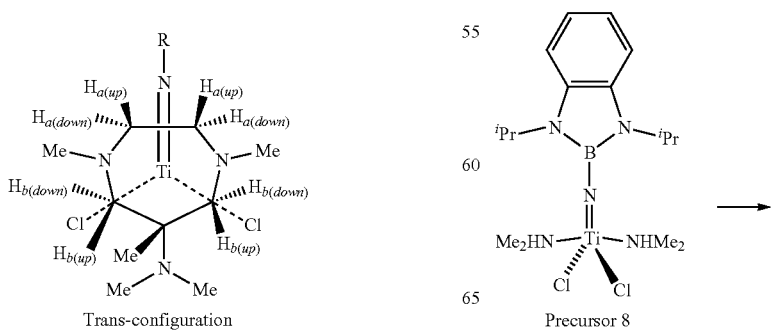

Trans-configuration

Cis-configuration

Major isomer (cis): $^1$H NMR (Toluene-d$_8$, 400.1 MHZ): δ 7.28 (6 H, overlapping 2×m, m- and p-C$_6$H$_3$$^i$Pr$_2$), 5.85 (2 H, s, NCH), 3.70 (4 H, sept., $^3$J=6.9 Hz, CHMeMe), 3.20 (1 H, m, H$_{f(down)}$), 3.02 (1 H, m, H$_{e(down)}$), 2.84 (1 H, d, 2J=14.6 Hz, H$_{g(down)}$), 2.54 (3 H, s, NMe$_b$), 2.36 (3 H, s, NMe$_d$), 2.14 (1 H, overlapping d, 2J=14.6 Hz, Hn(down)), 2.13 (3 H, s, NMe$_c$), 2.00 (3 H, s, NMe$_a$), 1.66 (12 H, app.dd, $^3$J=6.8 Hz, CHMeMe), 1.61 (1 H, m, H$_{f(up)}$), 1.51 (1 H, d, 2J=14.6 Hz, H$_{g(up)}$), 1.48 (1 H, m, H$_{e(up)}$), 1.31 (12 H, overlapping app.dd, $^3$J=6.8 Hz, CHMeMe), 1.25 (1 H, overlapping d, 2J=14.6 Hz, H$_{n(up)}$), 0.05 (3 H, s, CMe) ppm. $^{13}$C{$^1$H} NMR (Toluene-ds, 100.6 MHZ): δ 148.0 (o-C$_6$H$_3$$^i$Pr$_2$), 142.3 (i-C$_6$H$_3$$^i$Pr$_2$), 128.0 (p-C$_6$H$_3$Pr$_2$), 124.3 (m-C$_6$H$_3$Pr$_2$), 117.8 (NCH), 71.0 (Cg), 68.7 (Ch), 64.1 (Ct), 61.1 (CMe), 59.9 (Ce), 54.9 (NMe$_d$), 50.9 (NMe$_a$), 48.2 (NMes), 46.9 (NMe$_c$), 29.8 (CHMe$_2$), 24.1-27.8 (CHMe$_2$), 11.6 (CMe) ppm. $^{11}$B{$^1$H} NMR (Toluene-d$_8$, 128.4 MHZ): δ 14.0 ppm.

Minor isomer (trans): $^1$H NMR (Toluene-d$_8$, 400.1 MHZ): δ 7.28 (6 H, overlapping 2×m, m- and p-C$_6$H$_3$Pr$_2$), 5.87 (2 H, s, NCH), 3.69 (4 H, sept., $^3$J=6.9 Hz, CHMeMe), 3.33 (2 H, m, H$_{d(down)}$), 2.41 (2 H, d, 2J=14.4 Hz, H$_{b(down)}$, 2.29 (6 H, s, NMe), 1.84 (2 H, m, Ha(up)), 1.80 (6 H, s, NMe$_2$), 1.59 (12 H, d, $^3$J=6.8 Hz, CHMeMe), 1.48 (2 H, d, 2J=14.4 Hz, H$_{b(up)}$, 1.30 (12 H, d, $^3$J=6.8 Hz, CHMeMe),0.00 (3 H, s, CMe) ppm. $^{13}$C{$^1$H} NMR (Toluene-d$_8$, 100.6 MHZ): δ 147.9 (o-C$_6$H$_3$Pr$_2$), 142.2 (i-C$_6$H$_3$Pr$_2$), 127.9 (p-C$_6$H$_3$$^i$Pr$_2$), 124.2 (m-C$_6$H$_3$Pr$_2$), 117.0 (NCH), 70.3 (Cb), 64.1 (Ca), 59.8 (CMe), 54.6 (NMe), 43.2 (NMe$_2$), 29.8 (CHMeMe), 27.3 (CHMeMe), 24.4 (CHMeMe), 11.1 (CMe) ppm. $^{11}$B{$^1$H} NMR (Toluene-d$_8$, 128.4 MHZ): δ 14.0 ppm.

Common data: IR (NaCl plates, Nujol mull, cm$^{-1}$): 2356 (w), 1580 (w), 1406 (m), 1317 (m), 1249 (m), 1223 (w), 1173 (w), 1111 (m), 1072 (m), 1013 (m), 965 (m), 920 (m), 830 (m), 808 (m), 754 (s), 710 (m), 652 (s). Anal. found (calcd. for C$_{36}$H$_{59}$BCl$_2$NETi): C, 61.38 (61.29); H, 8.58 (8.43); N, 11.95 (11.91) %.

Example 12

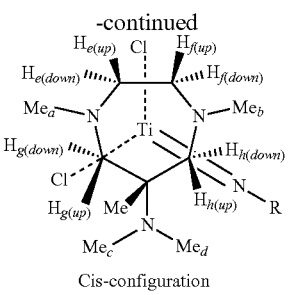

Precursor 8

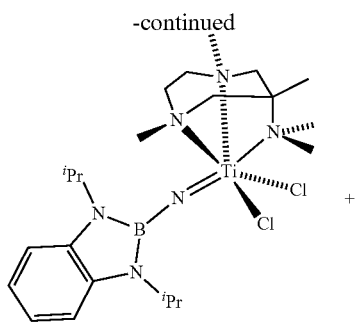

Example 12-trans

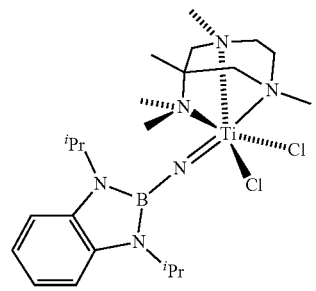

Example 12-cis

To a solution of Ti{NB(NiPr)$_2$C$_6$H$_4$} Cl$_2$ (NHMe$_2$)$_2$ (Precursor 8, 0.35 g, 0.826 mmol) in toluene (15 mL) was added Me$_4$DACH (212 μL, 1.07 mmol) via microsyringe at RT. The mixture was heated to 50° C. and then stirred for 16 h, after which time it had become a brown solution. The volatiles were removed under reduced pressure, and the orange solid washed with hexane (3×10 mL), then dried in vacuo, leaving Example 12 as an orange powder. Yield: 0.369 g (86%). The $^1$H NMR spectrum indicated an approximately 2:1 mixture of the cis and trans isomers. Diffraction-quality crystals were grown from a benzene solution at RT.

Major isomer (cis): $^1$H NMR (CD$_2$Cl$_2$, 400.1 MHZ): δ 6.96 (2 H, m, 3,4-C$_6$H$_4$), 6.72 (2 H, m, 2,5-C$_6$H$_4$), 4.95 (4 H, sept., $^3$J=6.9 Hz, CHMe$_2$), 3.83 (1 H, m, H$_{f(down)}$), 3.43 (1 H, m, H$_{e(down)}$), 3.40 (1 H, overlapping d, 2J=14.6 Hz, H$_{g(down)}$), 3.29 (3 H, s, NMe$_b$), 3.19 (3 H, s, NMe$_d$), 3.10 (1 H, overlapping d, 2J=14.6 Hz, H$_{h(down)}$), 2.77 (3 H, s, NMe$_c$), 2.69 (1 H, m, H$_{e(up)}$), 2.60 (1 H, overlapping d, 2J=14.6 Hz, Hg$_{(up)}$), 2.46 (1 H, overlapping m, H$_{f(up)}$), 2.44 (3 H, s, NMe$_a$), 2.36 (1 H, overlapping d, $^2$J=14.6 Hz, H$_{h(up)}$), 1.51 (12 H, overlapping d, $^3$J=6.9 Hz, CHMe$_2$), 0.95 (3 H, s, CMe) ppm. $^{13}$C{$^1$H} NMR (CD$_2$Cl$_2$, 100.6 MHZ): δ 135.0 (1,6-C$_6$H$_4$), 117.2 (2,5-C$_6$H$_4$), 111.1 (3,4-C$_6$H$_4$), 71.1 (Cg), 69.1 (Ch), 63.8 (Cf), 62.8 (CMe), 59.6 (Ce), 55.0 (NMe$_b$), 50.6 (NMe$_a$), 48.0 (NMe$_d$), 46.3 (NMe$_c$), 45.2 (CHMe$_2$), 21.9 (CHMe$_2$), 11.7 (CMe) ppm. $^{11}$B{$^1$H} NMR (CD$_2$Cl$_2$, 128.4 MHz): δ 13.6 ppm.

Minor isomer (trans): $^1$H NMR (CD$_2$Cl$_2$, 400.1 MHZ): δ 6.96 (2 H, m, 3,4-C$_6$H$_4$), 6.72 (2 H, m, 2,5-C$_6$H$_4$), 4.95 (4 H, sept., $^3$J=6.9 Hz, CHMe$_2$), 4.96 (4 H, sept., $^3$J=6.9 Hz, CHMeMe), 4.00 (2 H, d, $^3$J=6.4 Hz, H$_{d(down)}$), 3.81 (2 H, d, 2J=14.4 Hz, H$_{b(down)}$), 3.01 (2 H, d, $^3$J=6.4 Hz, H$_{a(up)}$), 2.72 (2 H, d, 2J=14.4 Hz, H$_{b(up)}$), 3.08 (6 H, s, NMe), 2.30 (6 H, s, NMe$_2$), 1.51 (12 H, overlapping d, $^3$J=6.9 Hz, CHMe$_2$), 0.83 (3 H, s, CMe) ppm. $^{13}$C{$^1$H} NMR (CD$_2$Cl$_2$, 100.6 MHZ): δ 134.9 (1,6-C$_6$H$_4$), 117.3 (2,5-C$_6$H$_4$), 111.2 (3,4-C$_6$H$_4$), 70.6 (Cb), 63.8 (Ca), 59.8 (CMe), 54.2 (NMe), 45.2 (CHMe$_2$), 42.9 (NMe$_2$), 21.9 (CHMe$_2$), 11.0 (CMe). $^{11}$B{$^1$H} NMR (CD$_2$Cl$_2$, 128.4 MHZ): δ 13.6 ppm.

Common data: IR (NaCl plates, Nujol mull, cm$^{-1}$): 2361 (w), 1940 (w), 1591 (s), 1410 (w), 1333 (m), 1285 (s), 1223 (w), 1201 (m), 1142 (s), 1086 (s), 1055 (w), 1024 (s), 987 (m), 931 (s), 881 (w), 827 (m), 785 (s), 754 (s), 664 (s). Anal. found (calcd. for C$_{36}$H$_{59}$BCl$_2$N$_6$Ti): C, 51.02 (50.90); H, 8.02 (7.96); N, 16.00 (16.19) %.

Example 13

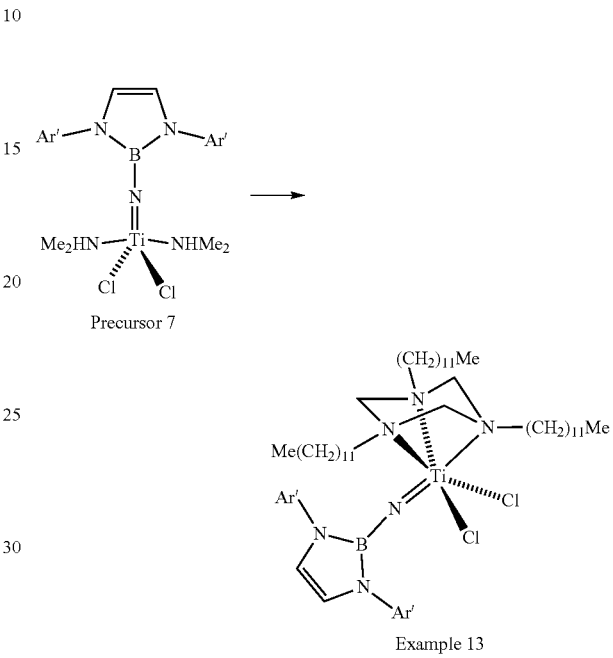

Example 13

To a Schlenk tube of Ti{NB(NAr'CH)$_2$} Cl$_2$ (NHMe$_2$)$_2$ (Precursor 7, 0.27 g, 0.443 mmol) and DD$_3$[6] aneN$_3$ (0.262 g, 0.443 mmol) was added toluene (10 mL) at RT and it was stirred for 6 h. Then, the volatiles were removed under reduced pressure and the residue was redissolved in toluene. This was repeated 4 times for every 6 h stirring, after which time it had become a red solution. It was then dried in vacuo, leaving Example 13 as an orange wax. Yield: 0.468 g (95%). The $^1$H NMR spectrum indicated 7% 1 and 7% unreacted 7 contained in the desired product. $^1$H NMR (C$_6$D$_6$, 400.1 MHZ): δ 7.31 (6 H, overlapping 2×m, m- and p-C$_6$H$_3$Pr$_2$), 5.82 (2 H, s, NCH), 4.35 (1 H, d, 2J=6.9 Hz, NCH$_2$N), 3.76 (2 H, d, 2J=6.9 Hz, NCH$_2$N), 3.63 (4 H, sept., $^3$J=6.9 Hz, CHMeMe), 3.11 (2 H, m, CH$_2$), 2.62 (2 H, d, 2J=6.9 Hz, NCH$_2$N), 2.59 (2 H, m, CH$_2$), 2.51 (2 H, m, CH$_2$), 2.06 (2 H, m, CH$_2$), 1.95 (2 H, d, 2J=7.9 Hz, NCH$_2$), 1.73 (12 H, d, $^3$J=6.9 Hz, CHMeMe), 1.48-0.95 (25 H, overlapping m, CH$_2$), 1.34 (12 H, d, $^3$J=6.9 Hz, CHMeMe), 0.92 (9 H, overlapping t, CH$_2$Me) ppm. $^{13}$C{$^1$H} NMR (C$_6$D$_6$, 100.6 MHZ): δ 146.9 (o-C$_6$H$_3$Pr$_2$), 140.9 (i-C$_6$H$_3$Pr$_2$), 127.2 (p-C$_6$H$_3$Pr$_2$), 123.8 (m-C$_6$H$_3$Pr$_2$), 116.4 (NCH), 73.7 (NCH$_2$N), 73.0 (NCH$_2$N), 56.2 (CH$_2$), 53.1 (CH$_2$), 51.8 (CH$_2$), 30.2-27.6 (CH$_2$), 29.8 (CHMeMe), 25.2 (CHMeMe), 24.4 (CHMeMe), 22.8 (CH$_2$), 14.1 (CH$_3$) ppm. $^{11}$B{$^1$H} NMR (C$_6$D$_6$, 128.4 MHZ): δ 13.9 ppm. IR (NaCl plates, Nujol mull, cm$^{-1}$): 1580 (m), 1322 (w), 1277 (w), 1257 (m), 1111 (m), 1094 (w), 1069 (w), 1015 (m), 942 (m), 897 (m), 801 (s), 763 (s), 715 (s), 650 (s). Anal. found (calcd. for C$_{65}$H$_{117}$BCl$_2$N$_6$Ti): C, 70.08 (70.19); H, 10.46 (10.60); N, 7.54 (7.56) %.

Example 14

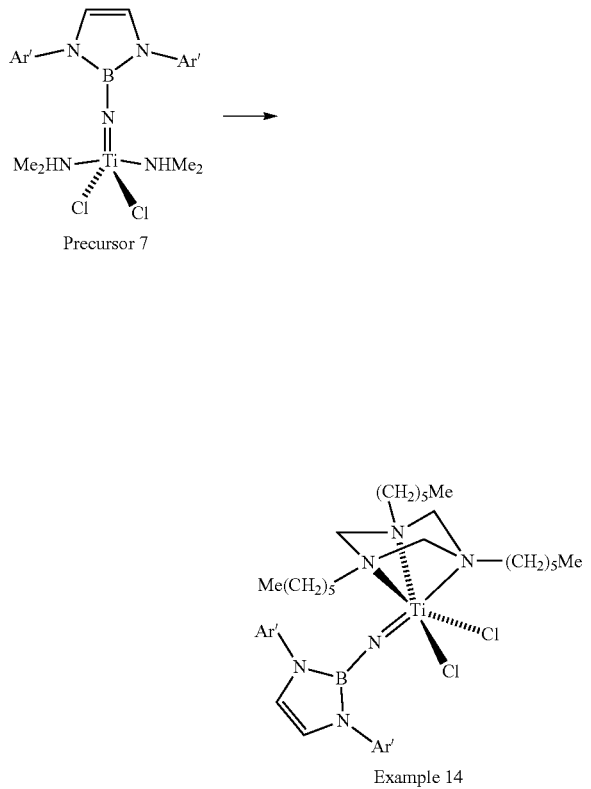

Precursor 7

Example 14

To a solution of Ti{NB(NAr'CH)$_2$} Cl$_2$ (NHMe$_2$)$_2$ (Precursor 7, 0.30 g, 0.492 mmol) in toluene (10 mL) at RT was added Hex$_3$[6] aneN$_3$ (193 μL, 0.492 mmol) and stirred for 3 h. Then, the volatiles were removed under reduced pressure and the residue was redissolved in toluene. This was repeated for every 3 h stirring, after which time it had become a yellow solution. The volatiles were removed under reduced pressure, and the yellow solid washed with hexane (3×5 mL), then dried in vacuo, leaving Example 14 as a yellow powder. Yield: 0.262 g (62%). $^1$H NMR (C$_6$D$_6$, 400.1 MHZ): δ 7.29 (6 H, overlapping 2×m, m- and p-C$_6$H$_3$Pr$_2$), 5.82 (2 H, s, NCH), 4.31 (1 H, d, 2J=7.2 Hz, NCH$_2$N), 3.72 (2 H, d, 2J=7.2 Hz, NCH$_2$N), 3.64 (4 H, sept., $^3$J=6.9 Hz, CHMeMe), 3.14 (1 H, d, 2J=7.2 Hz, NCH$_2$N), 3.07 (2 H, m, CH$_2$), 2.57 (2 H, d, 2J=7.2 Hz, NCH$_2$N), 2.50 (2 H, m, CH$_2$), 2.03 (2 H, m, CH$_2$), 1.71 (12 H, d, $^3$J=6.9 Hz, CHMeMe), 1.37-1.03 (9 H, overlapping m, CH$_2$), 1.33 (12 H, d, $^3$J=6.9 Hz, CHMeMe), 1.01 (6 H, t, $^3$J=7.3 Hz, CH$_2$Me), 0.84 (3 H, t, $^3$J=7.3 Hz, CH$_2$Me) ppm. $^{13}$C{$^1$H} NMR (C$_6$D$_6$, 100.6 MHZ): δ 146.9 Substitute Specification (o-C$_6$H$_3$$^i$Pr$_2$), 140.8 (i-C$_6$H$_3$Pr$_2$), 127.2 (p-C$_6$H$_3$Pr$_2$), 123.4 (m-C$_6$H$_3$Pr$_2$), 116.4 (NCH), 73.6 (NCH$_2$N), 73.0 (NCH$_2$N), 56.2 (NCH$_2$), 51.7 (NCH$_2$), 32.2 (CH$_2$), 31.9 (CH$_2$), 29.0 (CHMeMe), 27.3 (CH$_2$), 25.2 (CHMeMe), 25.0 (CH$_2$), 24.3 (CHMeMe), 24.1 (CH$_2$), 23.1 (CH$_2$), 23.0 (CH$_2$), 14.3 (CH$_2$Me), 14.2 (CH$_2$Me) ppm. $^{11}$B{$^1$H} NMR (C$_6$D$_6$, 128.4 MHZ): Õ 14.5 ppm. IR (NaCl plates, Nujol mull, cm$^{-1}$): 2354 (w), 1584 (w), 1416 (w), 1331 (w), 1308 (w), 1261 (m), 1277 (m), 1232 (w), 1160 (m), 1110 (s), 1084 (m), 1068 (w), 1011 (s), 945 (s), 894 (s), 805 (s), 751 (s), 720 (m), 647 (s). Anal. found (calcd. for C$_{47}$H$_{83}$BCl$_2$N$_6$Ti): C, 65.43 (65.50); H, 9.68 (9.71); N, 9.59 (9.75) %.

Example 15

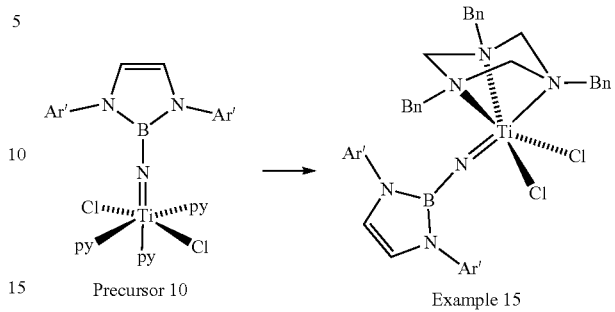

Precursor 10

Example 15

To a solution of Ti{NB(NAr'CH)$_2$} Cl$_2$ (py)$_3$ (Precursor 10, 0.35 g, 0.453 mmol) in toluene (10 mL) at RT was added BF$_3$-OEt$_2$ (173 μL, 1.359 mmol), which immediately resulted a dark green solution. After stirring the solution for 10 mins at RT, the solution was transferred via cannula into another Schlenk tube charged with Bn$_3$[6] aneN$_3$ (0.17 g, 0.453 mmol) and stirred at RT for 1 h, after which time it had become a yellow solution. Then the toluene solution was concentrated to 3 mL and layered with 15 mL hexane at RT, resulting in yellow crystals of Example 15 after 4 days. Yield: 0.224 g (48%). The $^1$H NMR spectrum indicated one equivalent of by-product BF$_3$-py was co-crystallised. $^1$H NMR (C$_6$D$_6$, 400.1 MHZ): δ 7.30 (4 H, d, $^3$J=7.3 Hz, m-C$_6$H$_3$Pr$_2$), 7.19 (4 H, m, o-C$_6$H$_3$Pr$_2$), 6.96 (8 H, overlapping m, o- and m-C$_6$H$_5$), 6.913 H, overlapping m, p-C$_6$H$_5$), 6.67 (4 H, overlapping m, o- and m-C$_6$H$_5$), 5.89 (2 H, s, NCH), 4.93 (1 H, d, 2J=7.2 Hz, NCH$_2$N), 4.36 (2 H, d, 2J=14.7 Hz, CH$_2$Ph), 3,89 (2 H, d, 2J=7.2 Hz, NCH$_2$N), 3.78 (4 H, sept., $^3$J=6.9 Hz, CHMeMe), 3.76 (2 H, d, 2J=14.7 Hz, CH$_2$Ph), 3.10 (1 H, d, 2J=7.2 Hz, NCH$_2$N), 3.01 (2 H, s, CH$_2$Ph), 2.13 (2 H, d, 2J=7.2 Hz, NCH$_2$N), 1.80 (12 H, d, $^3$J=6.9 Hz, CHMeMe), 1.35 (12 H, d, $^3$J=6.9 Hz, CHMeMe) ppm. $^{13}$C{$^1$H} NMR (C$_6$D$_6$, 100.6 MHZ): δ 147.0 (o-C$_6$H$_3$Pr$_2$), 140.8 (i-C$_6$H$_3$Pr$_2$), 132.2 (i-C$_6$H$_5$), 130.5-128.3 (o-, m- and p-C$_6$H$_5$), 127.4 (p-C$_6$H$_3$Pr$_2$), 123.5 (m-C$_6$H$_3$$^i$Pr$_2$), 116.4 (NCH), 73.1 (NCH$_2$N), 73.0 (NCH$_2$N), 60.5 (CH$_2$Ph), 55.8 (CH$_2$Ph), 29.0 (CHMeMe), 25.1 (CHMeMe), 24.6 (CHMeMe) ppm. $^{11}$B{$^1$H} NMR (C$_6$D$_6$, 128.4 MHZ): δ 15.1 ppm. IR (NaCl plates, Nujol mull, cm$^{-1}$): 2367 (w), 1628 (s), 1496 (w), 1344 (w), 1304 (w), 1280 (w), 1222 (w), 1117 (m), 1114 (s), 1088 (m), 1069 (m), 1015 (s), 968 (s), 934 (m), 895 (s), 805 (s), 779 (s), 763 (s), 698 (s), 687 (s), 656 (s), 616 (m). Residual BF$_3$-py could not be fully separated and a satisfactory elemental analysis was not obtained.

Comparative Examples

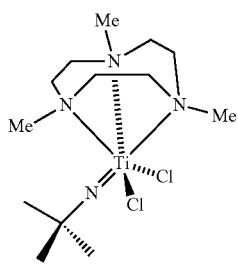

Comparative Example 1

Comparative Example 2

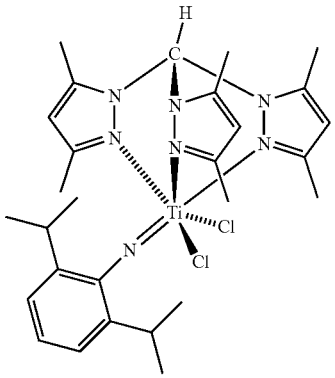

Comparative Example 1 was prepared according to Adams et al., Organometallics, 2006, 25 (16), 3888-3903. Comparative Example 2 was prepared according to Bigmore et al., Chem. Commun., 2006, 436-438.

Example 16-Catalyst immobilisation

The borylimide catalysts (Examples 1-15) and comparative example 1-2 were immobilised on polymethylaluminoxane (sMAO) using previously reported methodology (T. A. Q. Arnold, Z. R. Turner, J. C. Buffet and D. O'Hare, J. Organomet. Chem., 2016, 822, 85-90; D. A. X. Fraser, Z. R. Turner, J. C. Buffet and D. O'Hare, Organometallics, 2016, 35, 2664-2674).

In a glovebox, sMAO (250 mg, 200 eqv.) and the desired catalyst (1 eqv.) were added to a Schlenk flask. Toluene (40 mL) was then added and the slurry was heated at 60° C. for one hour with occasional agitation by hand. After this time, the mixture was filtered, leaving the sMAO-immobilised catalyst (1:200 ratio of Ti: Al) as a pale yellow powder which was then dried in vacuo.

Example 17-Polymerisation studies

Ethylene polymerisation: slurry-phase

In a glovebox, the immobilized catalyst (10 mg) was weighed into a thick-walled ampoule, along with triisobutylaluminum (TIBA, 150 mg) as co-catalyst, and hexane (50 mL). The ampoule was then cycled on to a Schlenk line and the $N_2$ atmosphere was partially removed under vacuum. The slurry was heated to the desired temperature (50, 60, 70 or 80° C.) and stirred vigorously prior to the addition of ethylene at 3 bar dynamic pressure. The mass of polyethylene produced was monitored after 15, 30 and 60 minutes. To terminate the polymerisation the ampoule was removed from the heat and ethylene was removed from the system under vacuum and replaced with $N_2$. The resulting polymer was filtered, washed several times with pentane, and dried.

The slurry-phase polymerisation results are summarised in Table 1 below.

TABLE 1

| Immobilised Catalyst | Temp./ ° C. | Reaction time | Activity/ $kg_{PE}$ $mol^{-1}$ $h^{-1}$ $bar^{-1}$ | $M_w/\times 10^6$ g $mol^{-1}$ | $M_n/\times 10^6$ g $mol^{-1}$ | $M_w/M_n$ |
|---|---|---|---|---|---|---|
| SMAO- Example 1 | 50 | 15 min | 2980 | 3.24 | 1.00 | 3.2 |
| | 60 | 30 min | 3790 | 2.19 | 0.54 | 4.1 |
| | 70 | 15 min | 4170 | 1.57 | 0.25 | 6.4 |
| SMAO- Example 3 | 50 | 15 min | 1300 | 3.78 | 1.02 | 3.7 |
| | 60 | 15 min | 1400 | 3.57 | 0.90 | 4.0 |
| | 70 | 15 min | 1290 | 2.75 | 0.59 | 4.7 |
| SMAO- Example 4 | 50 | 15 min | 980 | 1.95 | 0.57 | 3.4 |
| | 60 | 15 min | 740 | 2.46 | 0.45 | 5.5 |
| | 70 | 15 min | 620 | 1.79 | 0.31 | 5.7 |
| | 80 | 15 min | 490 | — | — | — |
| | 50 | 60 min | 100[a] | — | — | — |
| | 60 | 60 min | 80[a] | — | — | — |
| | 70 | 60 min | 80[a] | — | — | — |
| | 80 | 60 min | 70[a] | — | — | — |
| SMAO- Example 5 | 50 | 15 min | 790 | 3.99 | 0.83 | 4.8 |
| | 60 | 15 min | 780 | 3.88 | 0.62 | 6.3 |
| | 70 | 15 min | 890 | 3.19 | 0.33 | 9.6 |
| SMAO- Example 6 | 50 | 15 min | 980 | 3.94 | 0.75 | 5.3 |
| | 60 | 15 min | 1140 | 3.50 | 0.67 | 5.2 |
| | 70 | 15 min | 1150 | 2.84 | 0.30 | 9.3 |
| SMAO- Example 7 | 50 | 30 min | 20 | — | — | — |
| | 60 | 30 min | 40 | — | — | — |
| | 70 | 30 min | 80 | — | — | — |
| SMAO- Example 8 | 50 | 30 min | 180 | — | — | — |
| | 60 | 30 min | 90 | — | — | — |
| | 70 | 30 min | 70 | — | — | — |
| SMAO- Example 9 | 50 | 30 min | 40 | — | — | — |
| | 60 | 30 min | 20 | — | — | — |
| | 70 | 30 min | 10 | — | — | — |
| SMAO- Example 10 | 50 | 30 min | 230 | — | — | — |
| | 60 | 30 min | 50 | — | — | — |
| | 70 | 30 min | 40 | — | — | — |
| SMAO- Example 11 | 50 | 30 min | 180 | 2.39 | 0.25 | 9.5 |
| | 60 | 15 min | 230 | 1.55 | 0.14 | 11.2 |
| | 70 | 30 min | 200 | — | — | — |
| SMAO- Example 12 | 50 | 30 min | 10 | — | — | — |
| | 60 | 30 min | 30 | — | — | — |
| | 70 | 30 min | 20 | — | — | — |
| SMAO- Example 13 | 50 | 15 min | 410 | — | — | — |
| | 60 | 15 min | 480 | 0.47 | 0.07 | 6.5 |
| | 70 | 15 min | 590 | 0.85 | 0.23 | 3.7 |
| SMAO- Example 14 | 50 | 15 min | 430 | — | — | — |
| | 60 | 15 min | 590 | 1.61 | 0.38 | 4.3 |
| | 70 | 15 min | 650 | 0.88 | 0.12 | 7.1 |
| SMAO- Example 15 | 50 | 30 min | 400 | — | — | — |
| | 60 | 30 min | 290 | — | — | — |
| | 70 | 30 min | 840 | — | — | — |
| SMAO- Comparative Example 1 | 60 | 15 min | 3230 | 1.09 | 0.04 | 26.9 |
| SMAO- Comparative Example 2 | 70 | 15 min | 8140 | 1.00 | 0.09 | 10.6 |

[a] performed by using TEA, instead of TIBA, as scavenger.

Ethylene polymerisation: solution-phase

In a glovebox, the catalyst (0.5 mg or 2 mg) was weighed into a thick-walled ampoule, along with methylaluminoxane (MAO, 500 eqv for 2 mg catalyst loading or 1000 eqv for 0.5 mg catalyst loading) as co-catalyst, and toluene (50 mL). The ampoule was then cycled on to a Schlenk line and the $N_2$ atmosphere was partially removed under vacuum. The slurry was stirred vigorously at room temperature prior to the addition of ethylene at 3 bar dynamic pressure. The mass of polyethylene produced was monitored after 2, 6 and 15 minutes. To terminate the polymerisation the ethylene was removed from the system under vacuum and replaced with $N_2$. The resulting polymer was filtered, washed several times with pentane, and dried.

The solution-phase polymerisation results are summarised in Table 2 below.

TABLE 2

| Catalyst | Catalyst loading | Activity/kg$_{PE}$ mol$^{-1}$ h$^{-1}$ bar$^{-1}$ (reaction time) | M$_w$/×10$^6$ g mol$^{-1}$ | M$_n$/×10$^6$ g mol$^{-1}$ | M$_w$/M$_n$ |
|---|---|---|---|---|---|
| Example 1 | 0.5 mg | 12860 | 1.99 | 0.13 | 15.6 |
| Example 3 | 0.5 mg | 6740 | 2.93 | 0.56 | 5.3 |
|  | 2 mg | 4440$^a$ | — | — | — |
| Example 4 | 0.5 mg | 8270 | 3.42 | 0.72 | 4.8 |
| Example 5 | 2 mg | 2240 | 3.58 | 1.03 | 3.5 |
| Example 6 | 2 mg | 1090 | 3.48 | 0.98 | 3.5 |
| Example 7 | 2 mg | 150 (6 min) | — | — | — |
| Example 8 | 2 mg | 140 | — | — | — |
| Example 9 | 2 mg | 30 (15 min) | — | — | — |
| Example 10 | 2 mg | 80 | — | — | — |
| Example 11 | 2 mg | 2960 | 2.35 | 0.18 | 12.8 |
| Example 12 | 2 mg | trace | — | — | — |
| Example 13 | 0.5 mg | 9630 | 3.09 | 0.70 | 4.4 |
| Example 14 | 0.5 mg | 7590 | — | — | — |
| Example 15 | 2 mg | trace | — | — | — |
| Comparative Example 1 | 2 mg | 1840 (2 min) | — | — | — |
| Comparative Example 2 | 2 mg | 2880 (2 min) | — | — | — |

$^a$performed with 1 eqv. [Ph$_3$C][B(Ar$^F$)$_4$] (Ar$^F$ = C$_6$F$_5$, TBF$_{20}$) and 1000 eqv. TIBA.

The results presented in Tables 1 and 2 illustrate that the example catalysts are effective in the polymerisation of olefins, such as ethylene, both in the slurry and solution phases, typically with good catalyst activities. They produced linear polyethylenes with ultra-high molecular weight and/or moderate polydispersity.

While specific embodiments of the invention have been described herein for the purpose of reference and illustration, various modifications will be apparent to a person skilled in the art without departing from the scope of the invention as defined by the appended claims.

The invention claimed is:

1. A compound of Formula (I):

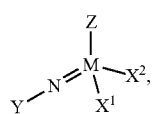
(I)

wherein:

M is selected from titanium, zirconium and hafnium;

X$^1$ and X$^2$ are independently selected from halo, C$_1$-C$_6$ alkyl, and C$_1$-C$_6$ alkoxy;

Y is

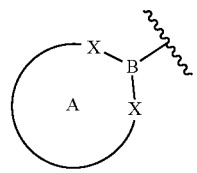

wherein

X is NR$^{10}$;

the heterocyclic ring A is optionally substituted with one or more substituents selected independently from halo, hydroxy, amino, C$_1$-C$_6$ alkyl, C$_1$-C$_6$ alkoxy, C$_1$-C$_6$ haloalkyl, aryl and heteroaryl, wherein said aryl and heteroaryl groups are optionally substituted with one or more substituents selected independently from halo, hydroxy, amino, nitro, C$_1$-C$_6$ alkyl and C$_1$-C$_6$ haloalkyl; and R$^{10}$ is an aryl group optionally substituted with one or more substituents selected independently from C$_1$-C$_6$ alkyl and C$_1$-C$_6$ haloalkyl; and Z is a tridentate ligand:

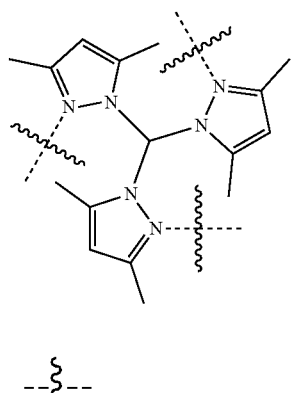

wherein each $\;\xi\;$ in the tridentate ligand Z denotes a point of attachment to M.

2. The compound according to claim 1, wherein Y is selected from one of the following groups:

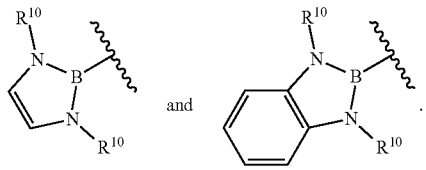

3. The compound according to claim 1, wherein M is titanium.

4. The compound according to claim 1, wherein X$^1$ and X$^2$ are independently selected from chloro and methyl.

5. The compound according to claim 1, wherein Y is:

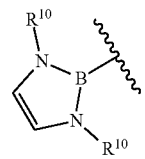

wherein R$^{10}$ is an aryl group optionally substituted with one or more substituents selected independently from C$_1$-C$_6$ alkyl.

6. The compound according to claim 5, wherein each R$^{10}$ is a group:

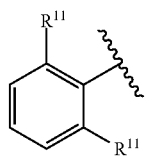

in which R$^{11}$ is C$_1$-C$_6$ alkyl.

7. The compound according to claim 6, wherein each R$^{11}$ is isopropyl.

8. The compound according to claim 7, wherein X$^1$ and X$^2$ are chloro.

9. The compound according to claim 8, wherein M is titanium.

10. A composition comprising a compound according to claim 1 immobilised on a solid support material.

11. The composition according to claim 10, wherein the solid support material is selected from silica, alumina, zeolite, layered double hydroxide, methylaluminoxane-activated silica, methylaluminoxane-activated layered double hydroxide and solid methylaluminoxane.

12. A process for the polymerisation of at least one olefin, the process comprising contacting the at least one olefin with a compound of claim 1.

* * * * *